US011086512B2

(12) United States Patent
Hou et al.

(10) Patent No.: US 11,086,512 B2
(45) Date of Patent: Aug. 10, 2021

(54) INFORMATION PROCESSING APPARATUS OF DISPLAYING TEXT WITH SEMANTIC SEGMENTS THEREOF MARKED AND DETERMINING AND DISPLAYING CANDIDATE OPERATIONS MATCHING USER INTENT CORRESPONDING TO THE TEXT, INFORMATION PROCESSING METHOD THEREOF, AND COMPUTER-READABLE STORAGE MEDIUM

(71) Applicant: Tencent Technology (Shenzhen) Company Limited, Shenzhen (CN)

(72) Inventors: Xinglin Hou, Beijing (CN); Chao Qi, Beijing (CN); Zhuoran Wang, Beijing (CN); Yuchi Ma, Beijing (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 62 days.

(21) Appl. No.: 15/933,803

(22) Filed: Mar. 23, 2018

(65) Prior Publication Data

US 2018/0275817 A1 Sep. 27, 2018

(30) Foreign Application Priority Data

Mar. 27, 2017 (CN) .......................... 201710187933.X

(51) Int. Cl.
*G06F 3/0488* (2013.01)
*G06F 3/0489* (2013.01)
(Continued)

(52) U.S. Cl.
CPC ...... *G06F 3/04886* (2013.01); *G06F 3/04895* (2013.01); *G06F 40/295* (2020.01);
(Continued)

(58) Field of Classification Search
CPC . H04M 1/72436; H04M 1/2757; G06F 40/30; G06F 40/295; G06F 3/04895;
(Continued)

(56) References Cited

U.S. PATENT DOCUMENTS 5,864,845 A * 1/1999 Voorhees .............. G06F 16/951
5,966,686 A * 10/1999 Heidorn ................ G06F 17/271
704/9

(Continued)

FOREIGN PATENT DOCUMENTS

CN 106155550 11/2016
CN 106325688 1/2017

*Primary Examiner* — David D Davis
(74) *Attorney, Agent, or Firm* — Anova Law Group, PLLC

(57) ABSTRACT

An information processing apparatus has a touch controllable display for displaying information, and an information processing method includes detecting a specific touch controlled operation on information including text displayed on a display, obtaining the text in the information touched by the specific touch controlled operation as a text-of-interest according to the detected specific touch controlled operation, performing a first natural language understanding processing which is based on word segmentation and named entity recognition on the text-of-interest to obtain a result of the word segmentation and a result of the named entity recognition for the text-of-interest, performing a second natural language understanding processing which is based on semantic analysis on the text-of-interest to obtain structured semantics of the text-of-interest in unit of semantic segments, and displaying the text-of-interest on the display in a manner that the semantic segments are marked.

23 Claims, 21 Drawing Sheets

(51) Int. Cl.
  *G06Q 10/10* (2012.01)
  *G06F 40/30* (2020.01)
  *G06F 40/295* (2020.01)
  *H04M 1/72436* (2021.01)
  *G06F 3/041* (2006.01)
  *H04M 1/2757* (2020.01)

(52) U.S. Cl.
  CPC ........... *G06F 40/30* (2020.01); *G06Q 10/109* (2013.01); *H04M 1/72436* (2021.01); *G06F 3/0412* (2013.01); *H04M 1/2757* (2020.01)

(58) Field of Classification Search
  CPC .. G06F 3/04886; G06F 3/0412; G06F 40/242; G06F 40/289; G06F 3/0484; G06F 3/04842; G06F 3/0488; G06F 40/284; G06Q 10/109
  See application file for complete search history.

(56) References Cited

U.S. PATENT DOCUMENTS

| | | | |
|---|---|---|---|
| 8,838,434 B1* | 9/2014 | Liu | G06F 17/289 |
| | | | 704/2 |
| 9,524,291 B2* | 12/2016 | Teodosiu | G06F 17/2785 |
| 10,027,796 B1* | 7/2018 | Almog | H04M 1/72597 |
| 2016/0162791 A1* | 6/2016 | Petersen | G06N 5/04 |
| | | | 706/11 |
| 2017/0068436 A1* | 3/2017 | Auer | G06F 3/04883 |
| 2017/0068445 A1* | 3/2017 | Lee | G06F 3/04886 |
| 2017/0068854 A1* | 3/2017 | Markiewicz | G06K 9/00416 |

* cited by examiner

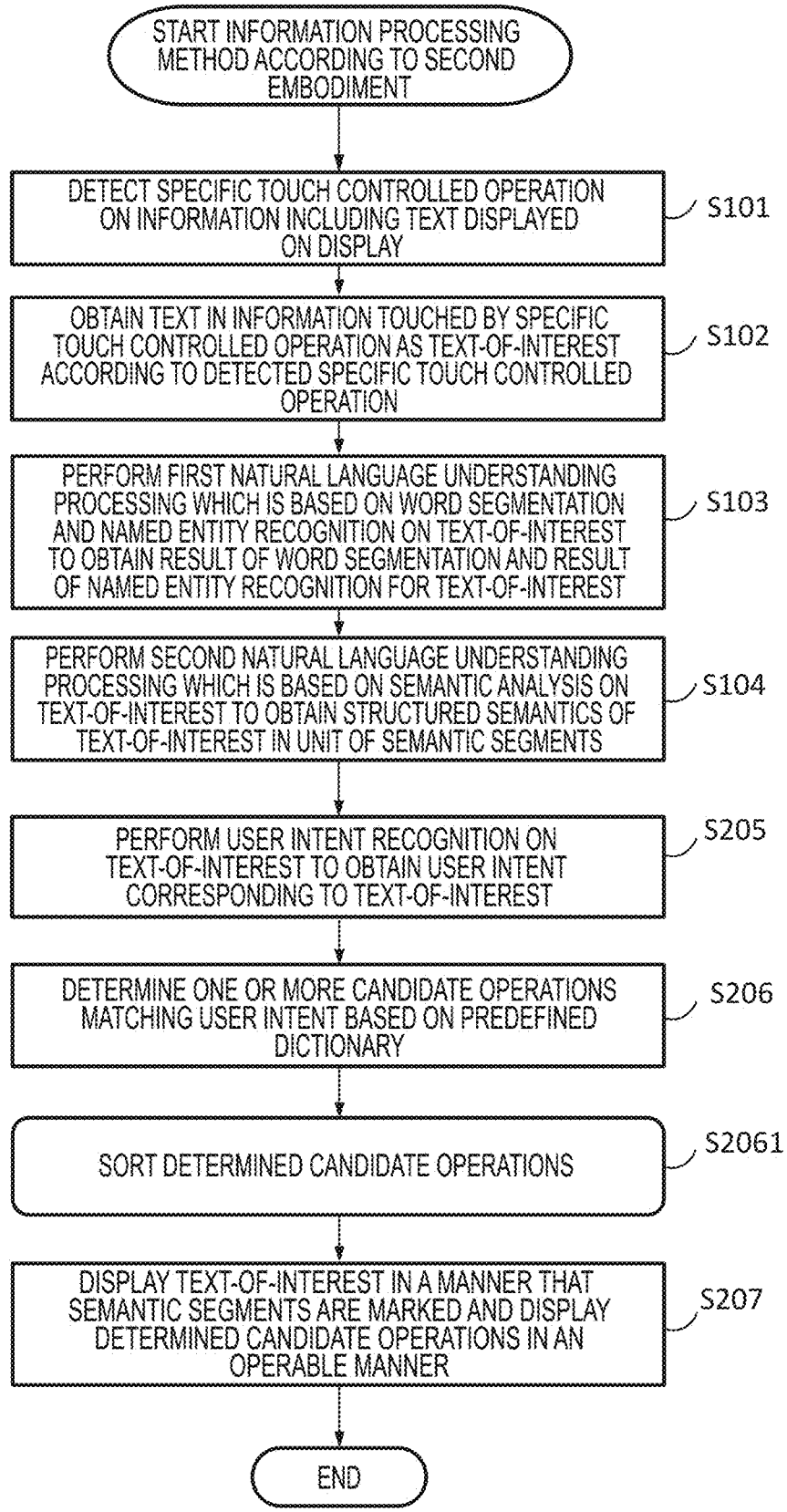

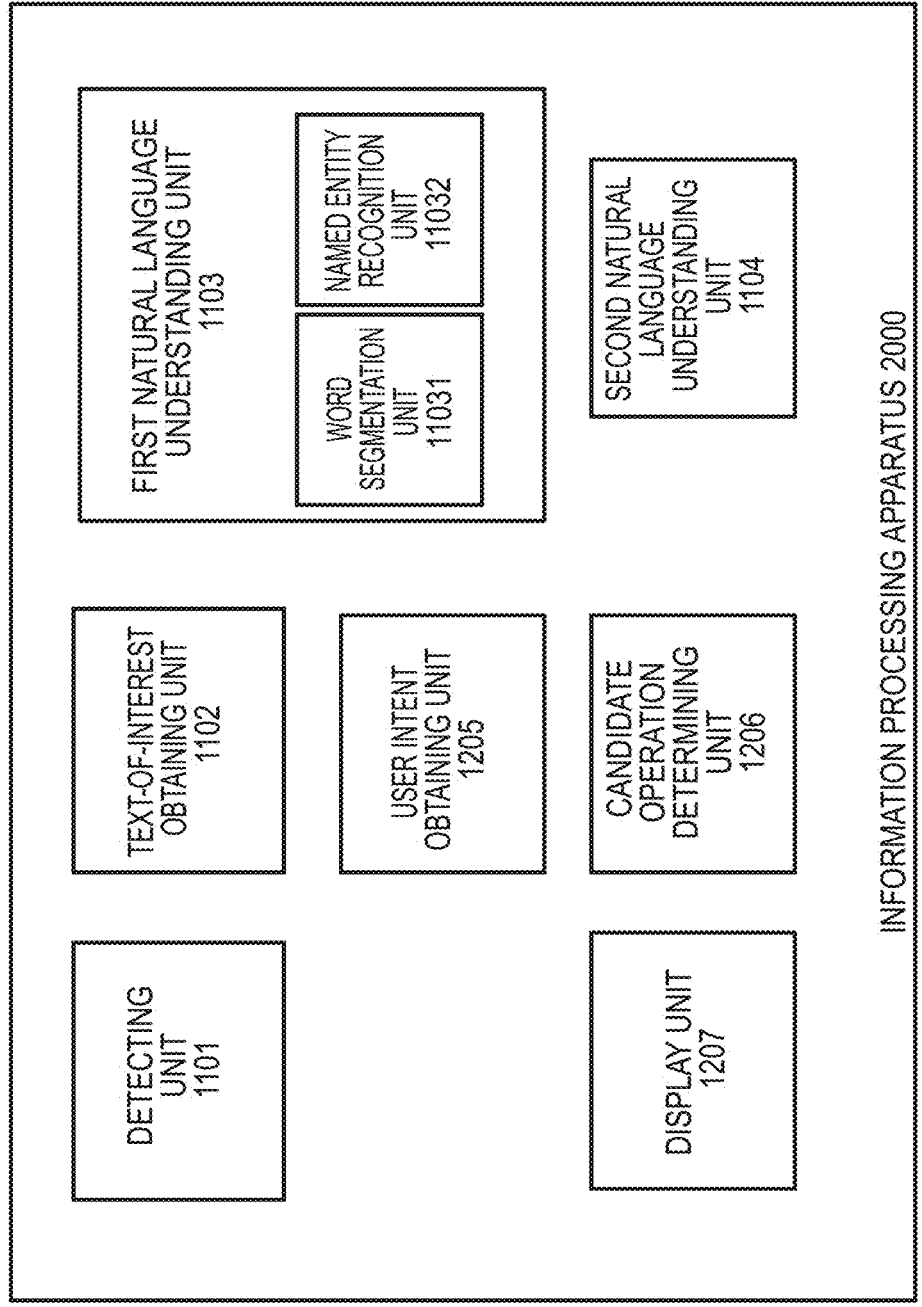

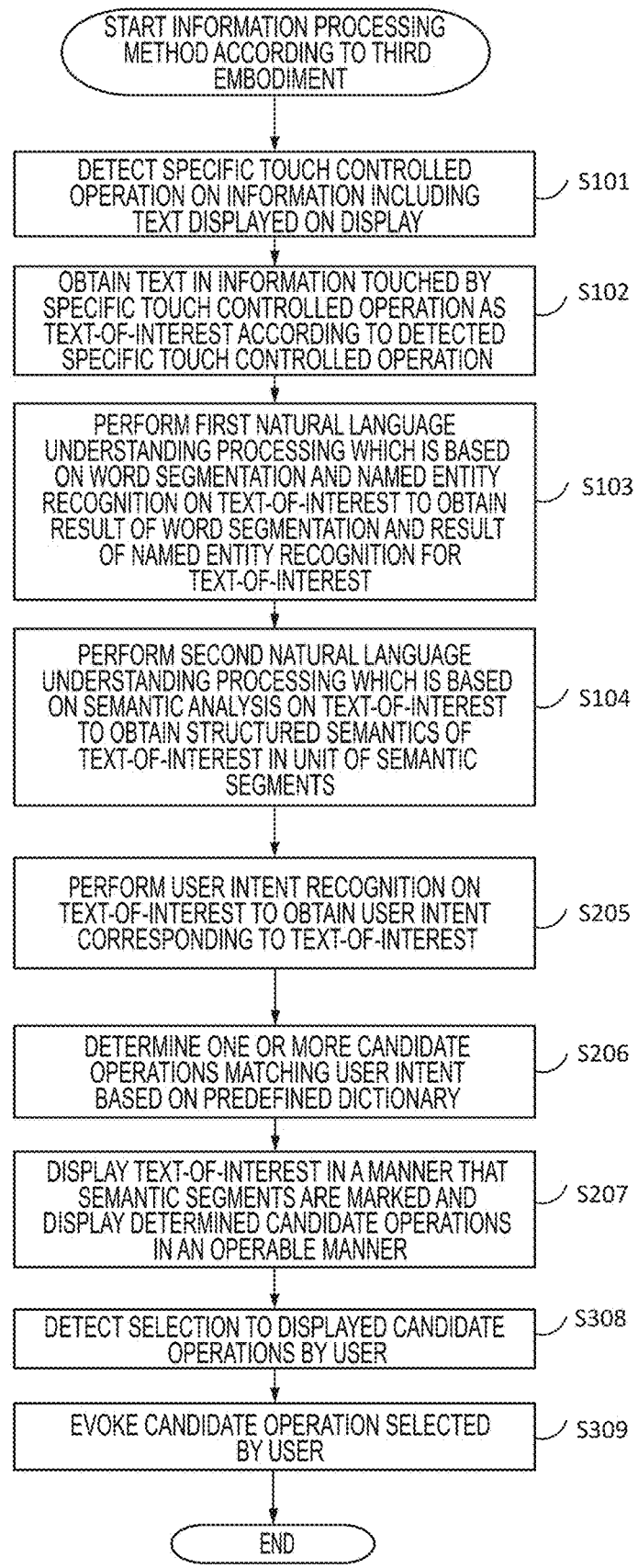

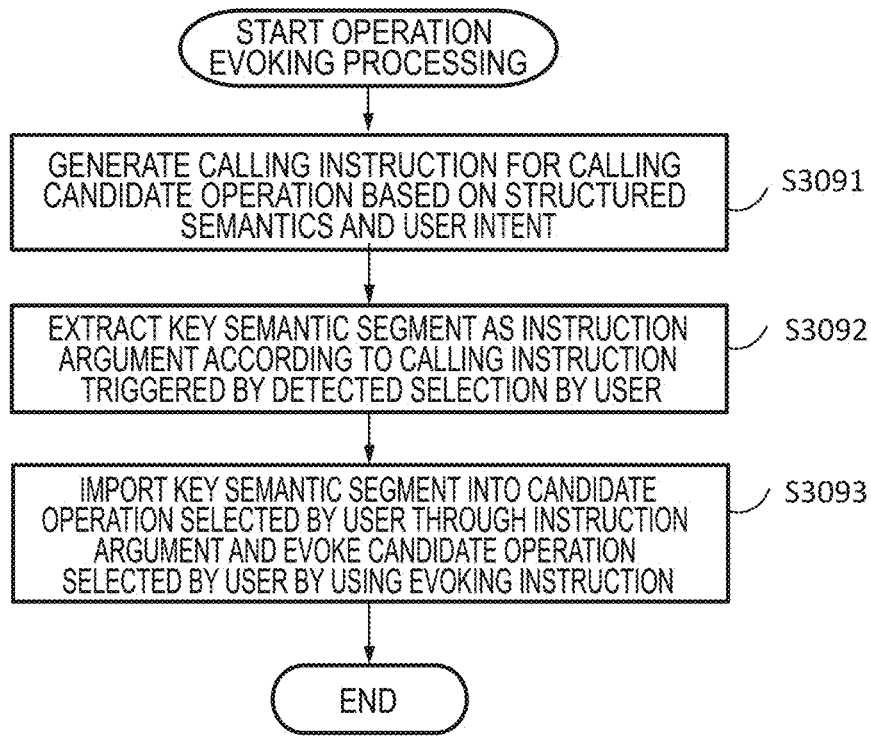
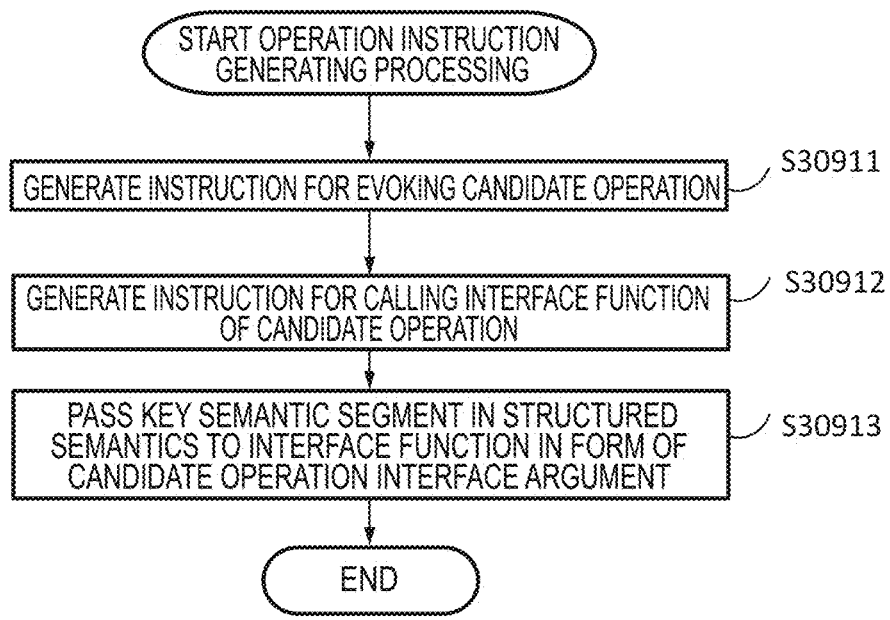

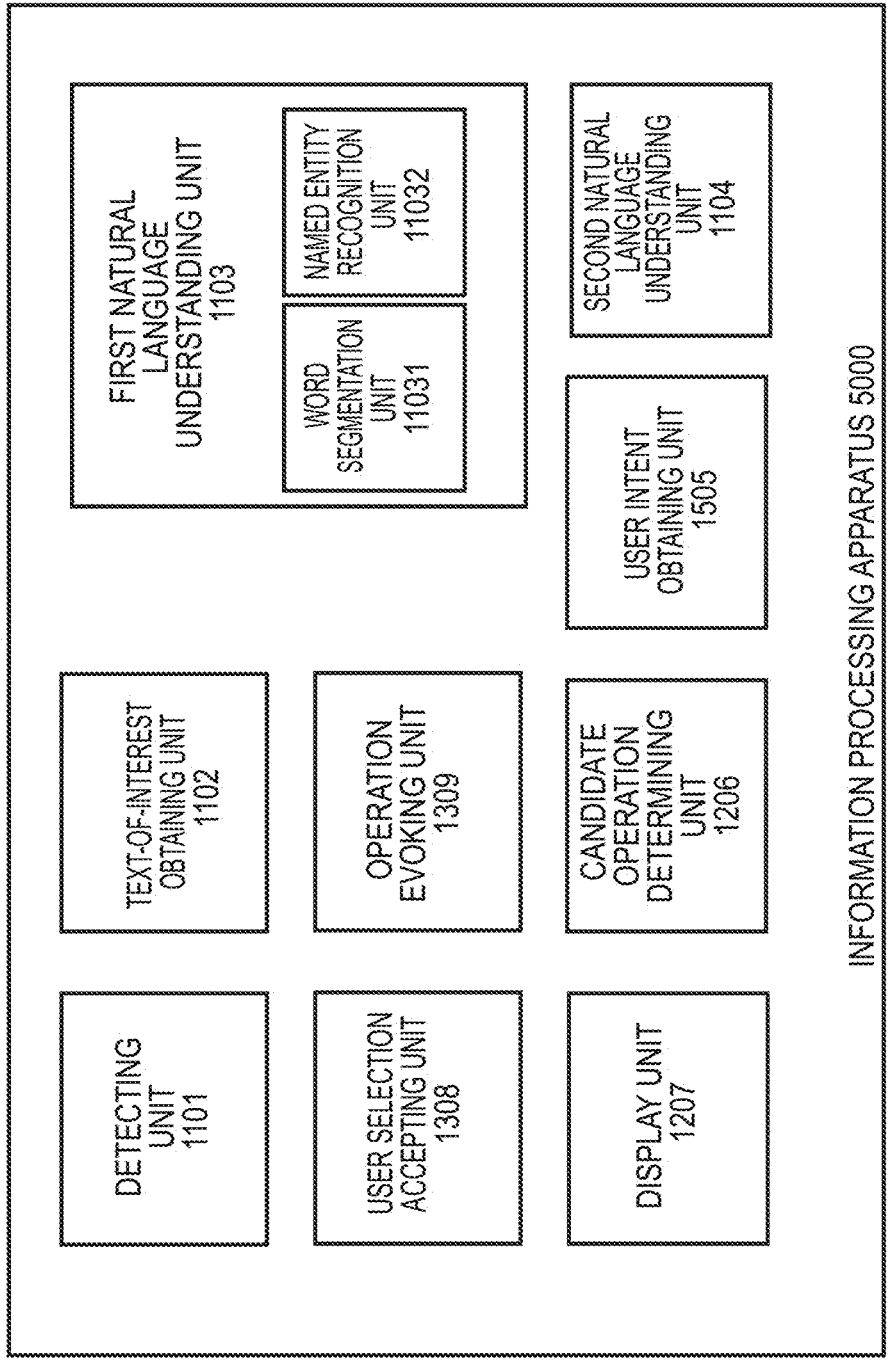

INFORMATION PROCESSING APPARATUS OF DISPLAYING TEXT WITH SEMANTIC SEGMENTS THEREOF MARKED AND DETERMINING AND DISPLAYING CANDIDATE OPERATIONS MATCHING USER INTENT CORRESPONDING TO THE TEXT, INFORMATION PROCESSING METHOD THEREOF, AND COMPUTER-READABLE STORAGE MEDIUM

BACKGROUND OF THE INVENTION

Field of the Invention

The present invention relates to an information processing apparatus and an information processing method for processing a displayed text.

Description of the Related Art

Recently, with the popularization of information processing apparatuses having touch screen displays, such as cell phones, tablet computers, and the like, ones receive, send, browse or process large amounts of text information, for example, short messages, news in instant messaging typed software, web page or application program, and the like, on information processing apparatuses such as cell phones or tablet computers almost every day. When the user of the information processing apparatus wants to select key information from the browsed text information for further operations, for example, selecting an address for navigation, selecting a time, an address, and an event for establishing reminder, selecting a movie name (a drama name or a tourist attraction, etc.) for buying movie tickets (drama tickets or attraction tickets, etc.), selecting a restaurant for ordering, selecting a name of dish or a restaurant for reservation or ordering, or selecting a hotel name for booking, etc., multi-step operations, such as selecting information, copying operation, closing the current page, finding the corresponding software, opening the corresponding software or web page, and pasting, etc., are needed, which cause operations cumbersome, take a long time and are not convenient.

In view of the above problems, Chinese patent application with publication number of CN106325688A proposes a text processing method and apparatus for facilitating the user of a touch-controlled terminal to select keywords in the text information for performing search and forwarding operations by using the word segmentation technique. However, the above method only performs word segmentation on the text information so that the user can select the keywords, but does not perform semantic structure analysis on the text information to obtain semantic segments, and does not automatically recognize the user's potential intents either. Therefore, when the user needs to select or perform further operations on the semantic segments, it is needed to select each word one by one to perform operation, and when the selected words are further needed to be further operated, for example, transferred to another application program or website, the user needs to manually exit the current interface, and manually find out and evoke the application program or web page needed to be operated and re-enter the previously selected keywords. This procedure of further operation still needs multi-step operations, which takes a long time and is not convenient.

In addition, Chinese patent application with publication number of CN106155550A proposes a method and an apparatus for displaying an interface which determines whether the combination of the touch controlled words and the adjacent words thereof is the preset types of objects such as telephone number, network hot words, and the like according to the touch controlled signal of the word on the terminal interface, and displays corresponding prompt information, such as making a call, explaining words, and the like. However, the above method can only process text segments that are continuous, but it is impossible to determine the user intents based on the entire text, to automatically extract the structured semantic segments that reflect the user's potential intents so that the user can confirm the intent, and to synthetically generate prompt information based on a plurality of text segments that are not continuous. For example, the requirement for users to simultaneously select a plurality of text segments that are not continuous to perform at one time a further operation (for example, simultaneously selecting time segments, address segments, event name segments to establish reminders) cannot be satisfied.

SUMMARY OF THE INVENTION

In view of the above problems in the prior art, the present invention has been developed. The present invention is intended to provide an information processing method and an information processing apparatus which are capable of improving the convenience of information operation of the user and has high user friendliness.

A first aspect of the present invention provides an information processing method for an information processing apparatus having a touch controllable display for displaying information, the information processing method comprising: a detecting step of detecting a specific touch controlled operation on information including text displayed on a display; a text-of-interest obtaining step of obtaining the text in the information touched by the specific touch controlled operation as a text-of-interest according to the detected specific touch controlled operation; a first natural language understanding step of performing a first natural language understanding processing which is based on word segmentation and named entity recognition on the text-of-interest to obtain a result of the word segmentation and a result of the named entity recognition for the text-of-interest; a second natural language understanding step of performing a second natural language understanding processing which is based on semantic analysis on the text-of-interest to obtain structured semantics of the text-of-interest in unit of semantic segments; and a displaying step of displaying the text-of-interest on the display in a manner that the semantic segments are marked. According to the above features of the present invention, the following technical effects are achieved: the user is enabled to select all of the word segmentations included in the semantic segment through a one-time operation, which improves the convenience of the user's operation; the user is enabled to know the semantic structure of the information at a glance by displaying the text-of-interest in a manner that the semantic segments are marked, which improves the user's readability; obtaining and marking the semantic segments makes it possible to automatically select all of the word segmentations or named entities included in the semantic segment, which facilitates the user's next operation.

Preferably, the information processing method further comprises: a user intent obtaining step of performing user intent recognition on the text-of-interest to obtain a user intent corresponding to the text-of-interest; a candidate operation determining step of determining one or more candidate operations matching the user intent based on a predefined dictionary, and in the displaying step, the text-of-interest is displayed in a manner that the semantic segments are marked, and the determined candidate operations are displayed in an operable manner. According to the above features of the present invention, by recognizing the user intent, determining the candidate operations, and displaying the candidate operations, it makes it possible to display the candidate operations that reflect the user intent only through a one-time operation of the user, thereby improving the convenience of user's operation.

Preferably, the determined candidate operations are displayed in an operable manner on the display interface on which the text-of-interest is displayed in a manner that the semantic segments are marked. According to the above features of the present invention, the following technical effects are achieved: the candidate operations are displayed in an operable manner on the display interface on which the structured semantic segments are displayed, which enables the user to implement an automatic operation on the key semantic segment in the text only by selecting a candidate operation on the same interface without closing the current display interface and reopening the display interface corresponding to the operation, and the friendliness of the interface and the convenience of user's operation are improved.

Preferably, in the user intent obtaining step, a semantic segment related to the obtained respective user intent among the semantic segments of the text-of-interest is further stored as a key semantic segment in association with the user intent, and the information processing method further comprising: a user selection accepting step of detecting a selection to the displayed candidate operations by the user; and an operation evoking step of evoking the candidate operation selected by the user by using a key semantic segment which is associated with the user intent matching the respective selected candidate operation as a semantic segment for importing into the candidate operation to be evoked. According to the above features of the present invention, the following technical effects are achieved: the operation evoking step enables the candidate operation (for example, an application) selected by the user to automatically perform the desired operation on the key semantic segment in the text, which improves the friendliness of the interface and the convenience of the user's operation.

Preferably, the information processing method further comprises: a semantic segment selection judging step of judging whether a selection to the displayed semantic segments by the user is detected; and a text-of-interest resetting step of using the semantic segment selected by the user as the text-of-interest so as to apply the second natural language understanding processing to the semantic segment selected by the user in a case where it is judged that the selection to the displayed semantic segments by the user is detected. According to the above features of the present invention, the following technical effects are achieved: the semantic segment selected by the user may be merged together to re-execute the procedure of the first embodiment, and the results of the first embodiment may also be used in part or in whole to continue the subsequent operations, thereby improving the friendliness of the interface and the convenience of the user's operation.

Preferably, in the user intent obtaining step, the user intent recognition is further performed on each of the semantic segments of the text-of-interest to obtain the user intent corresponding to each of the semantic segments that can reflect the user intent; and in the candidate operation determining step, the candidate operation corresponding to the obtained respective user intent is determined. According to the above features of the present invention, the following technical effects are achieved: the candidate operations corresponding to the text-of-interest and the candidate operations corresponding to each of semantic segments that may reflect the user intent are displayed to the user together, such that it is more convenient for the user to achieve performing desired operation on the text-of-interest or the semantic segments in the text-of-interest, thereby improving the friendliness of the interface and the convenience of the user's operation.

Preferably, in the displaying step, the text-of-interest is displayed in a manner of word segmentation with a semantic segment mark.

Preferably, the displaying step further comprises displaying the text-of-interest in a manner that a key semantic segment related to the user intent among the semantic segments of the text-of-interest are mark on type basis.

Preferably, the candidate operation is a candidate application program or a candidate website link that is capable of matching the user intent.

Preferably, the candidate operation determining step further comprises a candidate operation sorting step of sorting the determined candidate operations, and in the displaying step, the selected candidate operations are displayed in accordance with a ranking in the candidate operation sorting step.

Preferably, the operation evoking step further comprises: an operation instruction generating step of generating a calling instruction for calling the candidate operation based on the structured semantics and the user intent, the calling instruction including evoking instruction and instruction argument; a key semantic segment extracting step of extracting the key semantic segment as instruction argument according to the calling instruction triggered by the detected selection by the user; and an importing and evoking step of importing the key semantic segment into the candidate operation selected by the user through the instruction argument and evoking the candidate operation selected by the user by using the evoking instruction.

A second aspect of the present invention provides an information processing apparatus having a touch controllable display for displaying information, the information processing apparatus comprising: a detecting unit for detecting a specific touch controlled operation on information including text displayed on a display; a text-of-interest obtaining unit for obtaining the text in the information touched by the specific touch controlled operation as a text-of-interest according to the detected specific touch controlled operation; a first natural language understanding unit for performing a first natural language understanding processing which is based on word segmentation and named entity recognition on the text-of-interest to obtain a result of the word segmentation and a result of the named entity recognition for the text-of-interest; a second natural language understanding unit for performing a second natural language understanding processing which is based on semantic analysis on the text-of-interest to obtain structured semantics of the text-of-interest in unit of semantic segments; and a display unit for displaying the text-of-interest on the display in a manner that the semantic segments are marked.

A third aspect of the present invention provides an information processing apparatus having a touch controllable display for displaying information, the information processing apparatus comprising: a detecting unit for detecting a specific touch controlled operation on information including text displayed on a display; a text-of-interest obtaining unit for obtaining the text in the information touched by the specific touch controlled operation as a text-of-interest according to the detected specific touch controlled operation; a user intent obtaining unit for performing user intent recognition on the text-of-interest to obtain a user intent corresponding to the text-of-interest; a candidate operation determining unit for determining one or more candidate operations matching the user intent based on a predefined dictionary; and a display unit for displaying the determined candidate operations on the display in an operable manner. According to the above features of the present invention, the following technical effects are achieved: by recognizing the user intent, determining the candidate operations, and displaying the candidate operations, it makes it possible to display the candidate operations that reflect the user intent only through a one-time operation of the user, thereby improving the convenience of user's operation.

A fourth aspect of the present invention provides an information processing apparatus comprising: a detecting unit for detecting a specific touch controlled operation on information including text displayed on a display; and a display unit for displaying a candidate operation that can reflect user intent of the information in an operable manner in response to detecting the specific touch controlled operation on the information including the text.

A fifth aspect of the present invention provides an information processing apparatus comprising: a detecting unit for detecting a specific touch controlled operation on information including text displayed on a display; and a display unit for displaying the information in a manner that semantic segments are marked in response to detecting the specific touch controlled operation on the information including the text.

BRIEF DESCRIPTION OF THE DRAWINGS

To describe the technical solutions in the embodiments of the present application more clearly, the accompanying drawings required for describing the embodiments will be explained briefly below. Apparently, the accompanying drawings in the following description show merely some embodiments recorded in the present application, and for those skilled in the art, other accompanying drawings may also be obtained based on these accompanying drawings without any creative work.

FIG. 6 is a flowchart illustrating an information processing method according to a second embodiment of the present invention.

FIG. 8 is a block diagram illustrating a software configuration of the information processing apparatus according to the second embodiment.

FIG. 9 is a flowchart illustrating an information processing method according to a third embodiment of the present invention.

FIG. 11 shows a flowchart of an operation evoking processing in the information processing method according to the present invention.

FIG. 12 shows a flowchart of an operation instruction generating processing in the information processing method according to the present invention.

FIG. 19 is a block diagram illustrating a software configuration of the information processing apparatus according to the fifth embodiment.

DESCRIPTION OF THE EMBODIMENTS

Figure 1:
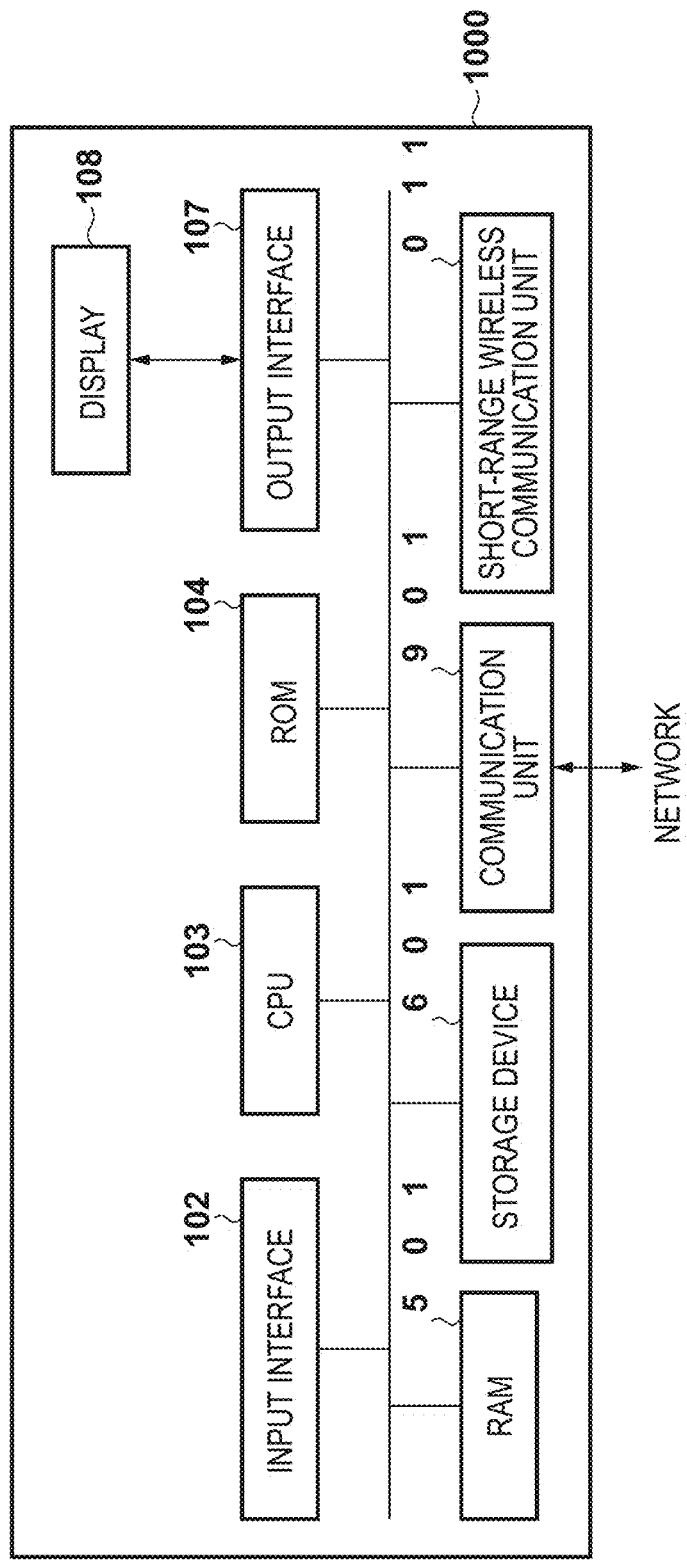
FIG. 1 is a diagram showing the hardware configuration of the information processing apparatus 1000 in the present embodiment.

Hereinafter, embodiments of the present invention will be described in detail with reference to the accompanying drawings. It should be understood that the following embodiments are not intended to limit the invention, and that all combinations of the aspects described in the following embodiments are not necessarily required with respect to the means of solving the problems according to the invention. For the sake of simplicity, the similar reference numerals or signs are used for the similar structural potions or steps, and the description thereof is omitted.

[Hardware Configuration of Information Processing Apparatus]

FIG. 1 is a diagram showing the hardware configuration of the information processing apparatus 1000 in the present embodiment. In the present embodiment, the description is given taking the smartphone as an example of the information processing apparatus. Note that the smartphone is exemplified as the information processing apparatus 1000 in the present embodiment, but it is obviously not limited to thereto. The information processing apparatus of the present invention may be various apparatuses, such as mobile terminal (for example, smart phone, smart watch, smart bracelet, and music player), laptop, tablet computer, PDA (personal digital assistant), facsimile apparatus, printer, or Internet device (such as digital camera, refrigerator, television, and the like) having a touch controlled screen and an information processing function, etc.

First, the hardware configuration of the information processing apparatus 1000 (2000, 3000, 4000, 5000) will be described with reference to the block diagram of FIG. 1. In addition, the following configuration is described as an example in this embodiment, but the information processing apparatus of the present invention is not limited to the configuration shown in FIG. 1.

The information processing apparatus 1000 includes an input interface 102, a CPU 103, a ROM 104, a RAM 105, a storage device 106, an output interface 107, a display 108, a communication unit 109, and a short-range wireless communication unit 110 which are connected to each other via a system bus. The input interface 102 is an interface for receiving data input by a user and execution instructions of functions, and is an interface for receiving data and operation instructions input from a user via an operation unit (not shown) such as a key, a button, or a touch screen. Note that the display 108 described later and the operation unit may be at least partially integrated, and may be a configuration in which output of screen and reception of user's operations are performed in the same screen, for example.

The CPU 103 is a system control unit, and controls the information processing apparatus 1000 comprehensively as a whole. In addition, for example, the CPU 103 performs display control of the display 108 of the information processing apparatus 1000. The ROM 104 stores fixed data such as data tables, control programs, and the like executed by the CPU 103 and operating system (OS) programs. In the present embodiment, various control programs are stored in the ROM 104, and software execution control such as scheduling, task switching, interrupt processing, and the like is performed under the management of the OS stored in the ROM 104, for example.

The RAM 105 is configured by, for example, an SRAM (Static Random Access Memory) which requires backup power, a DRAM, or the like. In this case, the RAM 105 may store important data, such as program control variables, in a non-volatile manner. In addition, the storage area for storing the setting information of the information processing apparatus 1000 and the management data of the information processing apparatus 1000 is also provided in the RAM 105. In addition, the RAM 105 is used as a work memory and a main memory of the CPU 103.

The storage device 106 stores, for example, a predefined dictionary, an application program for executing the information processing method according to the present invention, and the like. In addition, the storage device 106 stores various programs, such as an information transmission/reception control program for performing transmission/reception with a communication apparatus (not shown) via the communication unit 109, and various information used by these programs.

The output interface 107 is an interface for controlling the display 108 to display information and a display screen of the application program. The display 108 is configured by, for example, an LCD (Liquid Crystal Display). An input from a user via the display 108 may be received by arranging a soft keyboard with keys such as numeric input keys, mode setting keys, done key, cancel key and power key on the display 108.

The information processing apparatus 100 performs data communication with an external apparatus (not shown) via the communication unit 109 through a wireless communication method such as Wi-Fi (Wireless Fidelity), Bluetooth, cellular mobile communication (such as 2G, 3G, or LTE), or the like.

In addition, the information processing apparatus 1000 may also wirelessly connect and perform data communication with an external apparatus or the like over a short distance range via the short-range wireless communication unit 110. Also, the short-range wireless communication unit 110 performs communication through a different communication method from the communication unit 109. For example, Bluetooth Low Energy (BLE) of which communication range is shorter than that of the communication method of the communication unit 109 may be used as a communication method of the short-range wireless communication unit 110. In addition, as the communication method of the short-range wireless communication unit 110, NFC (Near Field Communication) or Wi-Fi Aware may be used, for example.

First Embodiment

[Information Processing Method According to First Embodiment]

The information processing method according to the present invention may be implemented by the CPU 103 of the information processing apparatus 1000 reading a control program stored on the ROM 104 or the storage device 106 or a control program downloaded via the communication unit 109 from a network server (not shown) connected to the information processing apparatus 1000 through a network.

Figure 2:
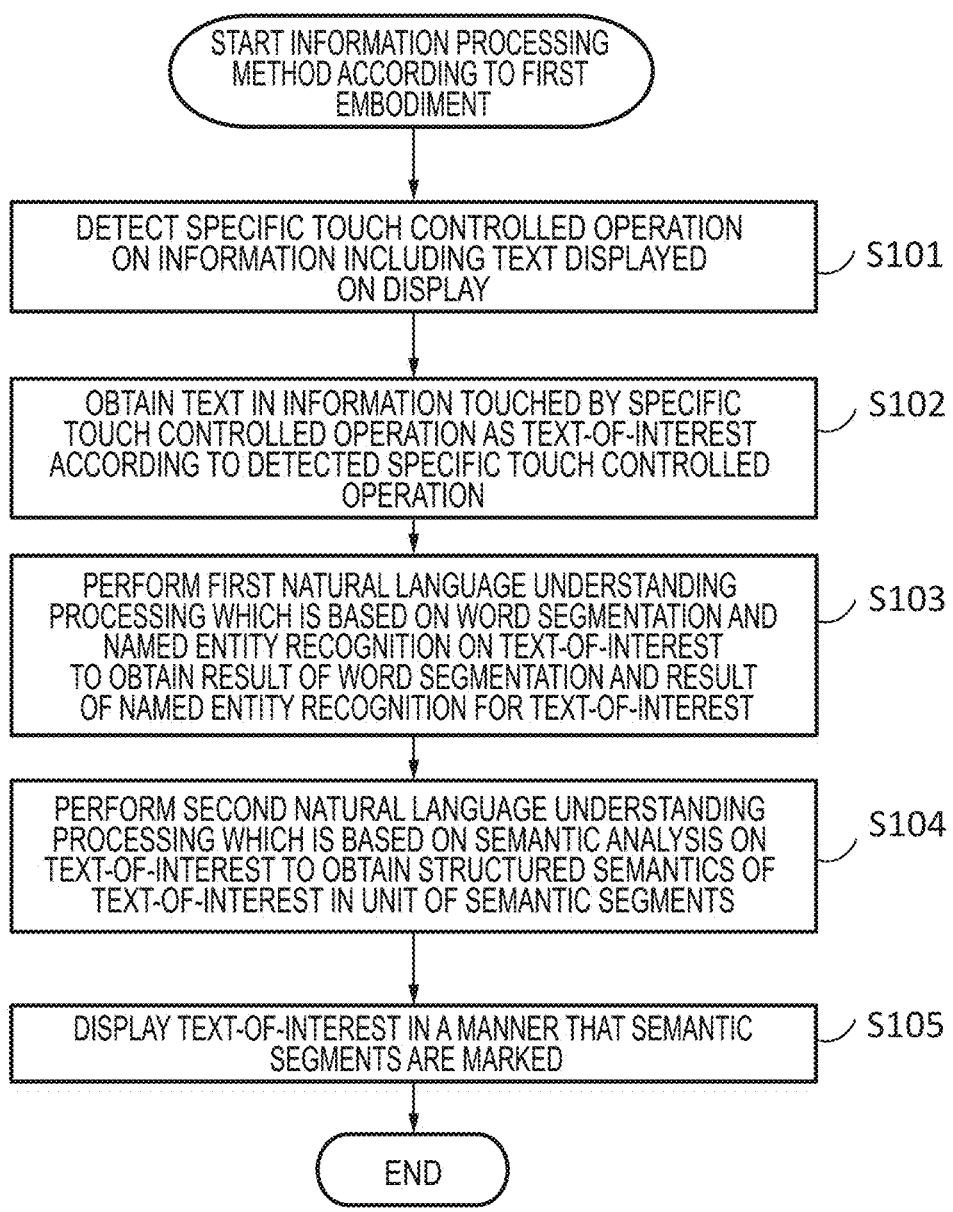
FIG. 2 is a flowchart illustrating an information processing method according to a first embodiment of the present invention.
Figure 3:
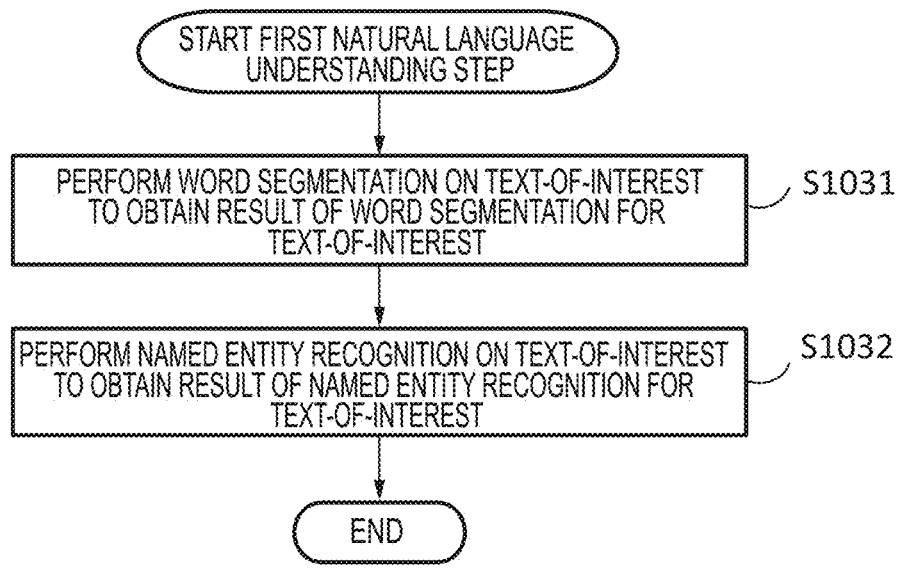
FIG. 3 is a flowchart illustrating a first natural language understanding processing of the information processing method according to the present invention.
Figure 4A:
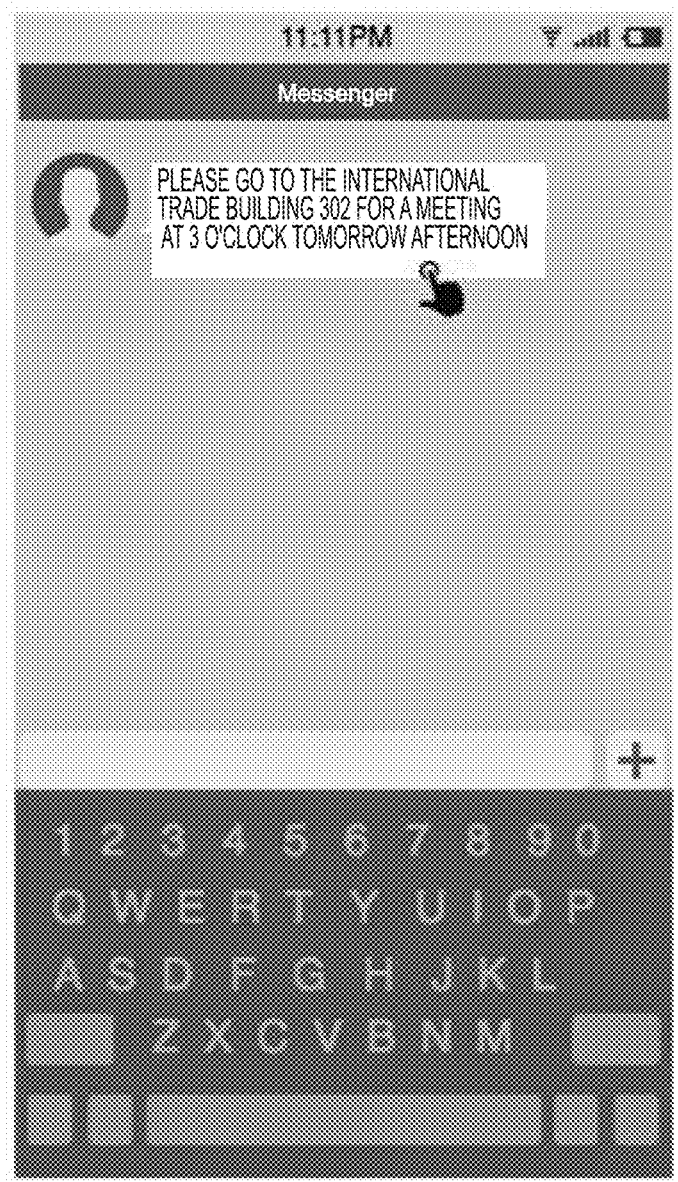
FIGS. 4A and 4B are display screens schematically illustrating the operation procedures of the information processing method according to the first embodiment of the present invention.
Figure 4B:
Figure 4C:
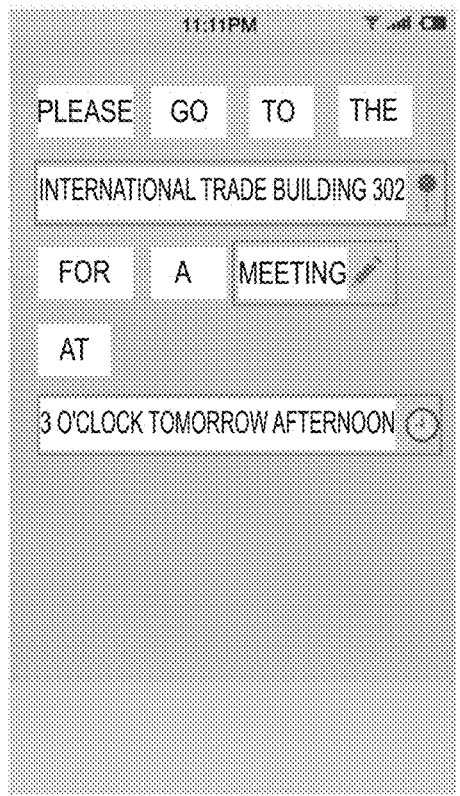
FIGS. 4C and 4D are display screens schematically illustrating a preferred embodiment of a displaying step of the information processing method according to the first embodiment of the present invention.
Figure 4D:
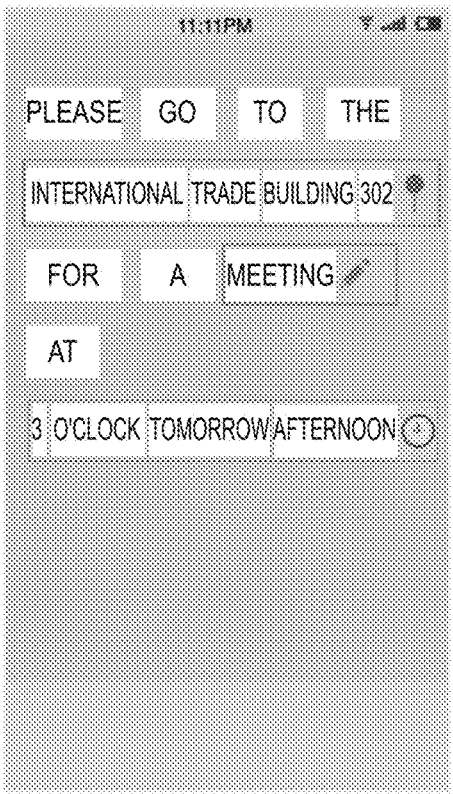

The information processing method according to a first embodiment of the present invention will be described below in conjunction with FIGS. 2 to 4D, in which, FIG. 2 is a flowchart illustrating an information processing method according to the first embodiment of the present invention; FIG. 3 is a flowchart illustrating a first natural language understanding processing of the information processing method according to the present invention; FIGS. 4A and 4B are display screens schematically illustrating the operation procedures of the information processing method according to the first embodiment of the present invention, and FIGS. 4C and 4D are display screens schematically illustrating a preferred embodiment of a displaying step of the information processing method according to the first embodiment of the present invention.

As shown in FIG. 2, first, in the detecting step S101, a specific touch controlled operation on the information including text displayed on the display is detected. This specific touch controlled operation may be a touch controlled operation in which at least one of the touch controlled mode, the touched screen area and the duration time reaches the respective threshold condition, for example, a sliding operation with the duration time and the touched screen area being within a specific range, or a stationary press operation with the touched screen area and the duration time reaching the respective threshold, and so on. After a specific touch controlled operation for the display information is detected, the process proceeds to step S102.

In the text-of-interest obtaining step S102, according to the detected specific touch controlled operation, the text in the information touched by this touch controlled operation is obtained as the text-of-interest, i.e., the text to be processed. For example, the display information may be determined according to the position information of the touch controlled operation, or the touched display information may be determined according to the position range in which the touch controlled operation is located. In addition, the words in a text module may be obtained as the text-of-interest by being directly read, and the words in an image module may be obtained as the text-of-interest by being recognized via text recognition software. Next, the process proceeds to step S103.

In the first natural language understanding step S103, the first natural language understanding processing which is based on word segmentation and named entity recognition is performed on the text-of-interest to obtain a result of the word segmentation and a result of the named entity recognition for the text-of-interest. Preferably, as shown in FIG. 3, the first natural language understanding step S103 further comprises: a word segmentation step S1031 of performing word segmentation on the text-of-interest to obtain a result of the word segmentation for the text-of-interest; a named entity recognition step S1032 of performing named entity recognition on the text-of-interest to obtain a result of the named entity recognition for the text-of-interest. Preferably, the named entity recognition processing in the information processing method according to the present invention may be implemented by, but not limited to, two models of a conditional random field (CRF) or a bidirectional long short-term memory network plus conditional random field (BiLSTM-CRF), and may be implemented by selecting appropriate model according to different effects, performance requirements and hardware and software environment.

For example, the user receives the information as shown in FIG. 4A on Feb. 23, 2017, and when the user performs a specific stationary press operation on the display information, the specific stationary press operation for this display information is detected in step S101, and the displayed text information "Please go to the International Trade Building 302 for a meeting at 3 o'clock tomorrow afternoon" is obtained through step S102 as the text-of-interest. Then, in step 1031, the text-of-interest is segmented to obtain a result of the word segmentation for "Please, go, to, the, International, Trade, Building, 302, for, a, meeting, at, 3, o'clock, tomorrow, afternoon", where the comma used to separate each word segmentation is schematically. In step S1032, it is recognized that "3 o'clock tomorrow afternoon" is a named entity of time type and "International Trade Building 302" is a named entity of address type.

Then, the process proceeds to step S104, in the second natural language understanding step S104, the second natural language understanding processing which is based on semantic analysis is performed on the text-of-interest to obtain structured semantics of the text-of-interest in unit of semantic segment. Preferably, the semantic analysis processing in the information processing method according to the present invention may be implemented by using, but not limited to, for example, a semantic parser which is based on Frame Semantic and context regardless grammars.

For example, for the display information as shown in FIG. 4A, after step S104, the following semantic structure represented by, for example, a JSON structure is obtained:

{"time": "2017-02-24 15:00:00", "location": "International Trade Building 302", "title": "meeting"}

Wherein, "2017-02-24 15:00:00" (corresponding to "3 o'clock tomorrow afternoon") is a semantic segment representing a time class; "International Trade Building 302" is a semantic segment representing an address class; and "meeting" is a semantic segment representing an event class.

Then, proceeding to the displaying step S105, the text-of-interest is displayed on the display in a manner that the semantic segments are marked. Here, the displaying in a manner that the semantic segments are marked may perform a display in a manner that each of the semantic segments is separated. Specifically, the display interface is generated, for example, by assigning one view control to each of the semantic segments and adding each of the semantic segments to the corresponding view control. As shown in FIG. 4B, the three semantic segments of "3 o'clock tomorrow afternoon", "International Trade Building 302" and "meeting" are displayed in a separated manner in unit of semantic segment. It is obviously that other means known to those skilled in the art may also be used for marking.

Preferably, as shown in FIG. 4C, it is also possible to mark the type of each of the semantic segments. For example, a time icon is marked for the named entity of time type of "3 o'clock tomorrow afternoon". In addition, as a preferred embodiment, an operable manner may be used for the mark of type. For example, when the user selects a mark of type, a semantic segment corresponding to the mark of type is automatically selected.

Preferably, the result of the word segmentation which is included each of the semantic segments may also be displayed in a word segmentation manner, for example, in a manner that each word segmentation is arranged in a separate view control as shown in FIG. 4D. It is obviously that other manners may also be used, such as displaying each word segmentation in each of the semantic segments apart from each other.

The above shows the flow of executing the second natural language understanding step S104 after the first natural language understanding step S103. Obviously, those skilled in the art understand that the execution orders of the first natural language understanding step S103 and the second natural language understanding step S104 may be interchanged with each other, or the first natural language understanding step S103 and the second natural language understanding step S104 may be executed in parallel.

According to the information processing method of the first embodiment of the present invention, by performing the second natural language understanding processing, which is based on semantic analysis, on the text-of-interest to obtain structured semantics of the text-of-interest in unit of semantic segment and displaying the text-of-interest on the display in a manner that the semantic segments are marked, the following technical effects may be achieved: a. the user is enabled to select all of the word segmentations included in the semantic segment through a one-time operation, which improves the convenience of the user's operation; b. the user is enabled to know the semantic structure of the information at a glance which improves the user's readability; c. it makes it possible to automatically select all of the word segmentations or named entities included in the semantic segment, which facilitates the user's next operation.

[Software Structure of Information Processing Apparatus According to First Embodiment]

Figure 5:
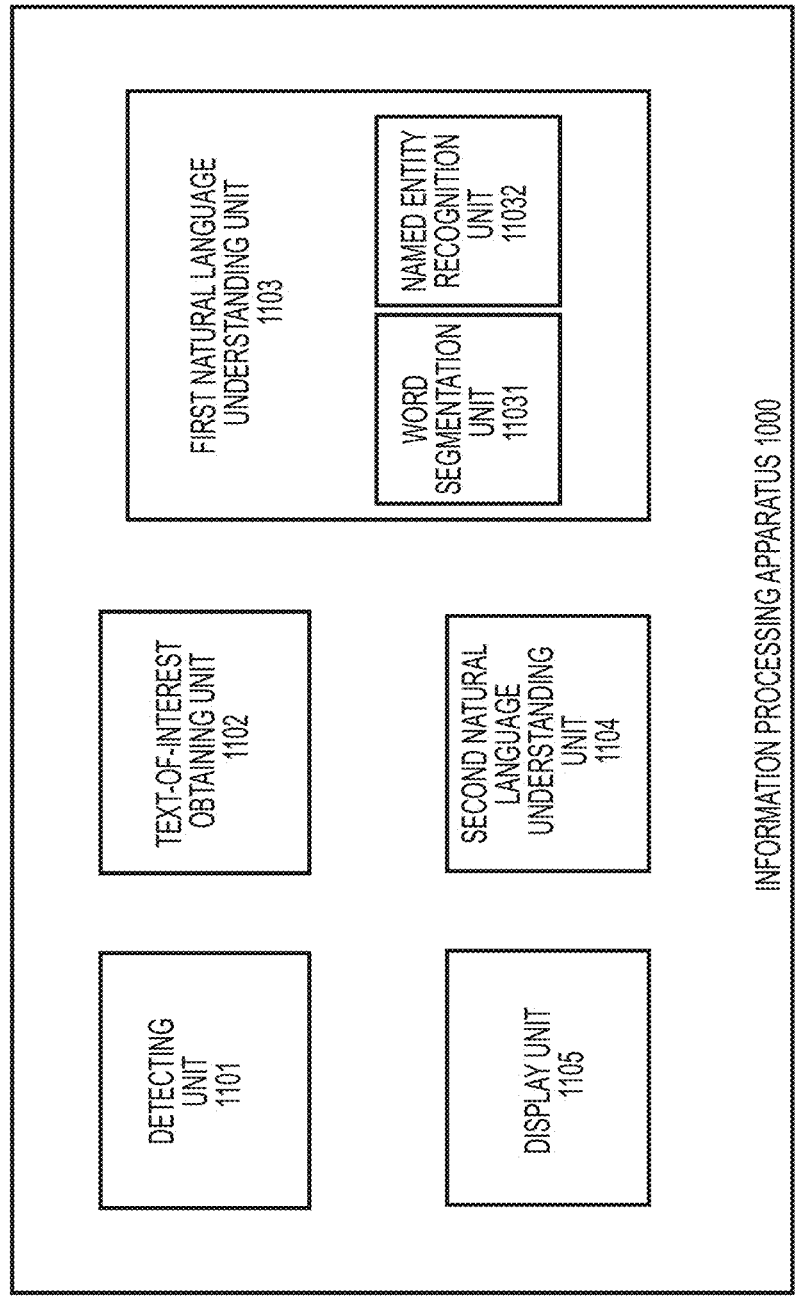
FIG. 5 is a block diagram illustrating a software configuration of the information processing apparatus according to the first embodiment.

FIG. 5 is a block diagram illustrating a software configuration of the information processing apparatus according to the first embodiment. As shown in FIG. 5, the information processing apparatus 1000 includes a detecting unit 1101, a text-of-interest obtaining unit 1102, a first natural language understanding unit 1103, a second natural language understanding unit 1104, and a display unit 1105. The detecting unit 1101 detects a touch controlled operation on the display 108; the text-of-interest obtaining unit 1102 obtains the text in the information touched by the touch controlled operation as the text-of-interest according to the detected specific touch controlled operation; the first natural language understanding unit 1103 includes a word segmentation unit 11031 that performs word segmentation on the text-of-interest to obtain a result of the word segmentation and a named entity recognition unit 11032 that performs a named entity recognition processing on the text-of-interest to obtain a result of the named entity recognition for the text-of-interest; the second natural language understanding unit 1104 performs semantic analysis on the text-of-interest to obtain structured semantics of the text-of-interest; and the display unit 1105 generates a display interface and displays the display interface including the text-of-interest on a display.

Second Embodiment

[Information Processing Method According to Second Embodiment]

Figure 7A:
FIGS. 7A to 7B are exemplary display screens schematically illustrating the operation procedures of the information processing method according to the second embodiment of the present invention.
Figure 7B:
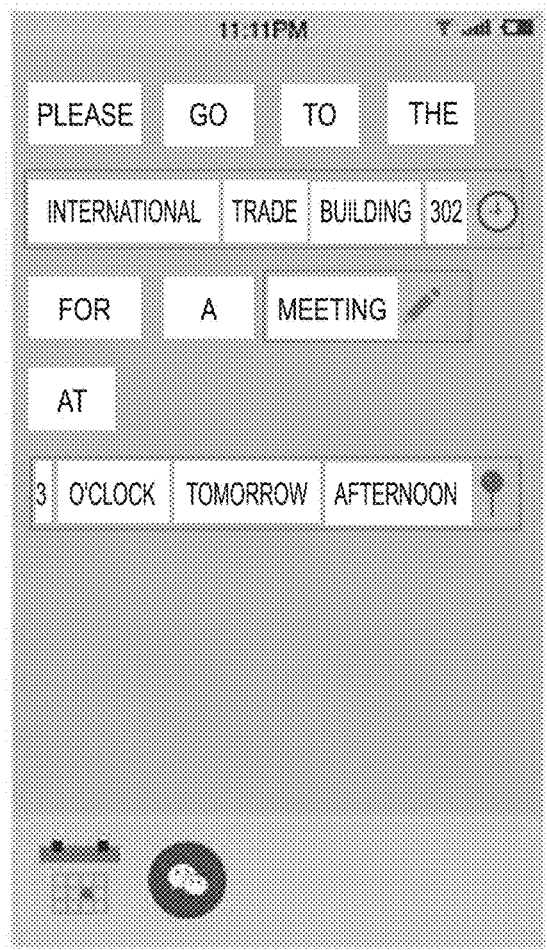

The information processing method according to a second embodiment of the present invention will be described below in conjunction with FIGS. 6 to 7B, in which, FIG. 6 is a flowchart illustrating an information processing method according to the second embodiment of the present invention, and FIGS. 7A to 7B are exemplary display screens schematically illustrating the operation procedures of the information processing method according to the second embodiment of the present invention.

As shown in FIG. 6, the information processing method according to the second embodiment is different from the information processing method according to the first embodiment in that the user intent obtaining step S205 and the candidate operation determining step S206 are added, and the displaying step S105 in the first embodiment is replaced with the displaying step S207.

Specifically, in the user intent obtaining step S205, user intent recognition is performed with respect to the text-of-interest to obtain the user intent corresponding to the text-of-interest. Preferably, in the user intent obtaining step S205, a semantic segment related to the obtained respective user intent among the semantic segments of the text-of-interest may also be stored as a key semantic segment in association with the user intent. Here, in the present invention, "user intent" means a desired processing that the user intends to perform on the text-of-interest according to the content of the text-of-interest. Preferably, the intent recognition in the information processing method according to the present invention may be implemented by using, but not limited to, any one of the following two models, one being Support Vector Machine (SVM) and the other being Convolutional Neural Network (CNN). Any one of the two models may be chosen according to different effects, performance requirements and hardware and software environment to carry out.

Then, in the candidate operation determining step S206, one or more candidate operations matching the user intent are determined based on a predefined dictionary. A candidate operation is an operation that is capable of matching the user intent, that is, an operation that enables the user to implement the desired processing. Preferably, the candidate operation is a candidate application program or a candidate website link that is capable of matching the user intent. Then, in the displaying step S207, the text-of-interest is displayed in a manner that the semantic segments are marked, and the determined candidate operations are displayed in an operable manner. As an example, the determined candidate operations may be displayed in an operable manner on a display interface on which the text-of-interest is displayed in a manner that the semantic segments are marked. For example, as shown in FIG. 7B, an icon of a candidate application program or a candidate website link which represents a candidate operation may be displayed in the same display screen on which the text-of-interest text is displayed, or a floating window of the candidate application program or the candidate website link which represents the candidate operation may be arranged and superimposed on the display screen on which the text-of-interest text is displayed. For ease of description and understanding, as an example, FIG. 6 shows that the user intent obtaining step S205 and the candidate operation determining step S206 are executed after the second natural language understanding step S104, but it is obviously that the steps S205 and S206 may also be executed before the first natural language understanding step S103, or may be executed before the second natural language understanding step S104 and after the first natural language understanding step S103, or may be executed in parallel with the first natural language understanding step S103 and/or the second natural language understanding step S104.

As a preferable embodiment, after the candidate operation determining step S206, a candidate operation sorting step S2061 may be further performed to sort the determined candidate operations. Accordingly, in the displaying step S207, the selected candidate operations are displayed in accordance with the ranking in the candidate operation sorting step. Preferably, the sorting of the candidate operations used by the present invention may be implemented by, but not limited to, such a method of: calculating the features, such as a quality score of the application program or the website link, a bid score of the application program or the website link, a popularity score of the application program or the website link, a relevance score to intent of the application program or the website link, a confidence score of intent classification, etc., for each application program or website link; weighting the above features to obtain the final scores of the application programs and website links; and then sorting the application programs and website links based on the final scores, where a linear model or a non-linear model may be used during the procedure of weighting the features to obtain the final scores.

Table 1 illustrates a list of user intent recognized according to the information processing method of the second embodiment of the present invention. For example, with respect to the display information shown in FIG. 7A, as shown in Table 1, the user intents of "reminder" and "forward to instant messenger contacts" are obtained by performing user intent recognition on the text-of-interest of "Please go to the International Trade Building 302 for a meeting at 3 o'clock tomorrow afternoon" in the user intent obtaining step S205.

TABLE 1

| Text ID | Text Content | Intent ID | Intent Name | Key Semantic Segment |
|---|---|---|---|---|
| T0001 | Please go to the International Trade Building 302 for a meeting at 3 o'clock tomorrow afternoon | I001 | Reminder | "3 o'clock tomorrow afternoon", "International Trade Building 302", "meeting" |
| T0001 | Please go to the International Trade Building 302 for a | I003 | Forward to instant messenger | "3 o'clock tomorrow afternoon", "International Trade |

TABLE 1-continued

| Text ID | Text Content | Intent ID | Intent Name | Key Semantic Segment |
|---|---|---|---|---|
| | meeting at 3 o'clock tomorrow afternoon | | contacts | Building 302", "meeting" |

Predefined dictionary is stored in advance in the information processing apparatus, and the user intents are stored in association with the candidate operations that is capable of matching the user intent in the predefined dictionary. Table 2 illustrates a predefined dictionary in the information processing method according to the present invention. Here, there may be a plurality of candidate operations corresponding to a same type of candidate operation (for example, a third-party application) for each intent, and it is determined, according to the actual installation situation by the user, which candidate operation is called.

TABLE 2

| Intent Name | Type of Candidate Operation | Candidate Operation |
|---|---|---|
| Address | App | Dididache\|Uber, Auto Navi Map\|Baidu map\|Google map, WeChat\|Momo |
| | Sys | SMS |
| | URL | www.baidu.com\|www.google.com |
| Reminder | App | WeChat |
| | Sys | Calendar, Alarm, SMS |
| Contact | Sys | Contacts, Call, SMS |
| Ticket | App | Ctrip\|Qunar\|Expedia, WeChat\|Momo |
| | Sys | Calendar, SMS |
| Watching | App | Iqiyi\|Youku\|Tencent video |
| Movie | URL | www.douban.com |
| Music | App | Netease Music\|QQ Music\|Kuwo Music\|Xiami Music, Changba |

As shown in Table 2, the candidate operations corresponding to the intent of "Address" include third-party application software (App) of "Dididache" or "Uber", third-party application software (App) of "Auto Navi Map" or "Baidu map", website link (URL) of "www.baidu.com" or "www.google.com", third-party application software (App) of "WeChat" or "Momo", as well as system built-in application program (Sys) of "SMS".

For example, with respect to the display information shown in FIG. 7A, as shown in Table 1, in the user intent obtaining step S205, user intent recognition is performed on the text-of-interest of "Please go to the International Trade Building 302 for a meeting at 3 o'clock tomorrow afternoon" and the user intents of "Reminder" and "Forward to instant messenger contacts" are obtained. In the candidate operation determining step S206, based on the predefined dictionary, the candidate operations matching the user intent of "Reminder" are determined to be the system built-in application program of "Calendar" and the third-party application software (App) of "WeChat" according to the condition of the software installed in the information processing apparatus used by the user. In the displaying step (S207), the determined candidate operations of "Calendar" and "WeChat" are displayed in an operable manner on the display interface on which the text-of-interest are displayed in a manner that the semantic segments are marked, as shown in FIG. 7B.

According to the information processing method of the second embodiment of the present invention, by obtaining the user intent, determining the candidate operations corresponding to the user intent, and displaying the candidate operations, it makes it possible to display the candidate operations that reflect the user intent only through a one-time operation of the user, thereby improving the friendliness of the interface and the convenience of user's operation. In addition, the candidate operations are displayed in an operable manner on the display interface on which the structured semantic segments are displayed, which enables the user to implement an automatic operation on the key semantic segment in the text only by selecting a candidate operation on the same interface without closing the current display interface and reopening the display interface corresponding to the operation, and the friendliness of the interface and the convenience of user's operation are improved.

In addition, in the above second embodiment, a case where the natural language understanding processing (the first natural language understanding step and/or the second natural language understanding step) and the user intent recognition processing (the user intent obtaining step) are executed in parallel or sequentially is illustrated as an example, since the user intent recognition processing does not depend on the processing result of the above natural language understanding processing, the user intent recognition processing and the natural language understanding processing may be performed independently of each other. That is, as a modified embodiment, after the specific touch controlled operation is detected and the text-of-interest is obtained (steps S101 and S102), only the user intent recognition (step S205) may be performed on the text-of-interest with the natural language understanding processing not performed (i.e., step S103 and step S104 are not performed), and after one or more candidate operations matching the user intent are determined (step S206), the determined candidate operations are displayed. Preferably, the determined candidate operations may be displayed on a display interface on which the text-of-interest is displayed. Alternatively, the display unit displays the text-of-interest in a manner that the semantic segments are marked on a display interface on which the determined candidate operations are displayed in an operable manner.

According to the above modified embodiment, by the user intent recognition processing and displaying the candidate operations that reflect the user intent, the user is enabled to make the candidate application program or the candidate website link that is capable of matching the user intent to display only through a one-time operation, thereby further improving the friendliness of the interface and the convenience of operation. At the same time, performing the user intent recognition only on the text-of-interest may also save resources and improve processing speed.

[Software Structure of Information Processing Apparatus According to Second Embodiment]

FIG. 8 is a block diagram illustrating a software configuration of the information processing apparatus according to the second embodiment. As shown in FIG. 8, the information processing apparatus 2000 according to the second embodiment is different from the information processing apparatus 1000 according to the first embodiment in that a user intent obtaining unit 1205 and a candidate operation determining unit 1206 are added, and the display unit 1105 is replaced with the display unit 1207.

Specifically, the user intent obtaining unit 1205 performs user intent recognition with respect to the text-of-interest to obtain the user intent corresponding to the text-of-interest, and stores the semantic segment related to the obtained respective user intent in the semantic segment of the textof-interest as key semantic segment in association with the user intent. The candidate operation determining unit 1206 determines one or more candidate operations matching the user intent based on the predefined dictionary, and the display unit 1207 not only displays the text-of-interest in a manner that the semantic segments are marked, but also displays the determined candidate operations in an operable manner on the display interface on which the text-of-interest are displayed in a manner that the semantic segments are marked.

Third Embodiment

[Information Processing Method According to Third Embodiment]

Figure 10A:
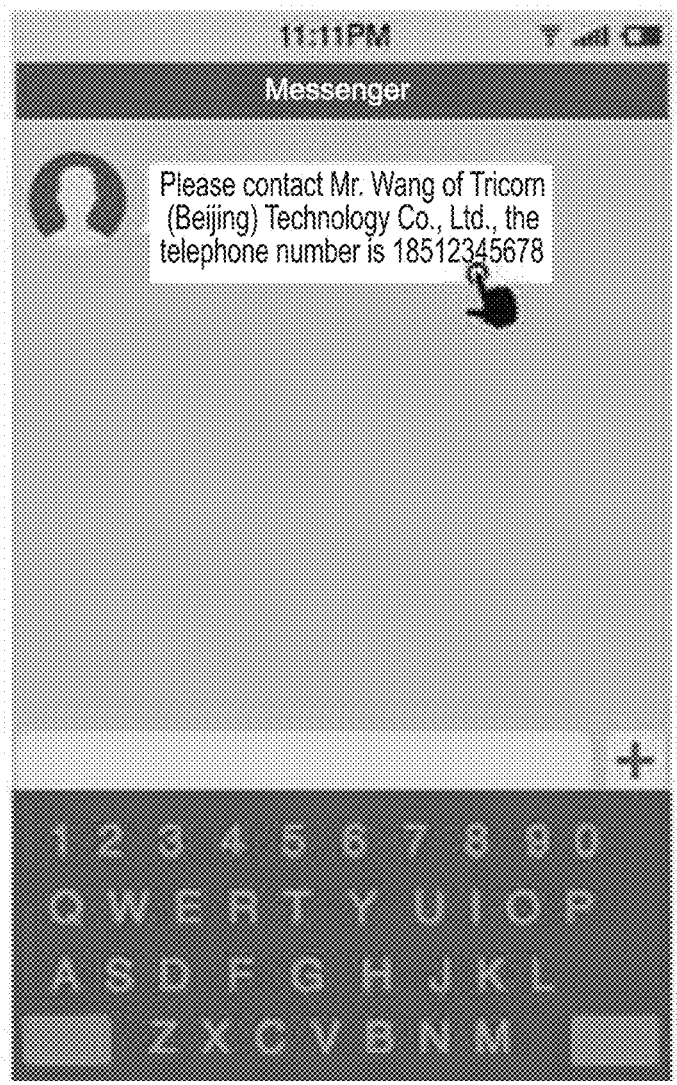
FIGS. 10A to 10C are exemplary display screens schematically illustrating the operation procedures of the information processing method according to the third embodiment of the present invention.
Figure 10B:
Figure 10C:
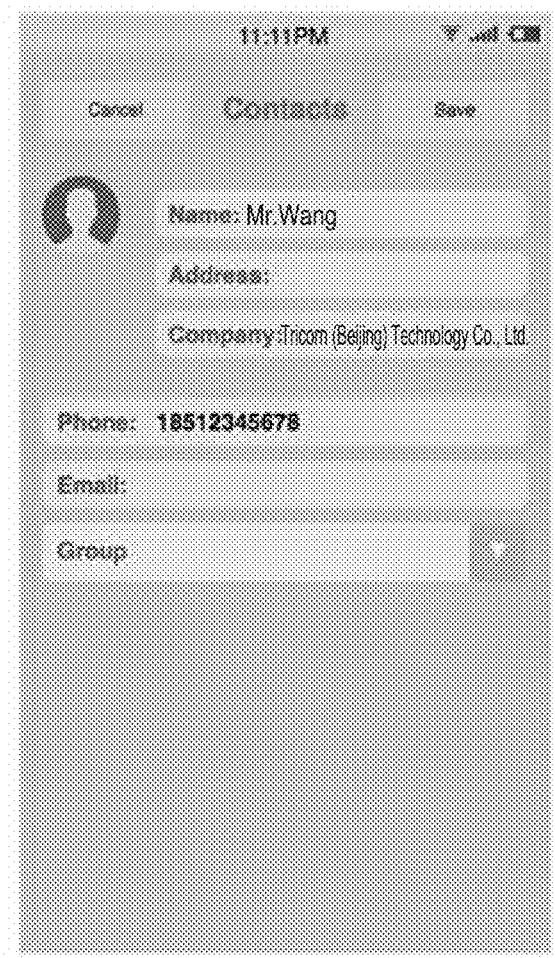

An information processing method according to a third embodiment of the present invention will be described below in conjunction with FIG. 9 and FIGS. 10A to 10C, in which, FIG. 9 is a flowchart illustrating an information processing method according to the third embodiment of the present invention, and FIGS. 10A to 10C are exemplary display screens schematically illustrating the operation procedures of the information processing method according to the third embodiment of the present invention.

As shown in FIG. 9, the information processing method according to the third embodiment is different from the information processing method according to the second embodiment in that the user selection accepting step S308 and the operation evoking step S309 are added.

Specifically, in the user selection accepting step S308, the selection to the displayed candidate operations by the user is detected; when the selection by the user is detected, the process proceeds to the operation evoking step S309 of evoking the candidate operation selected by the user by using the key semantic segment which is associated with the user intent matching the respective selected candidate operation as a semantic segment for importing into the operation to be evoked.

Further, preferably, as shown in FIG. 11 (FIG. 11 shows a flowchart of an operation evoking processing in the information processing method according to the present invention), the operation evoking step S309 further comprises an operation instruction generating step S3091 of generating a calling instruction for calling a candidate operation based on the structured semantics and the user intent, the calling instruction comprising evoking instruction and instruction argument, a key semantic segment extracting step S3092 of extracting the key semantic segment as instruction argument according to the calling instruction triggered by the detected selection by the user; and importing and evoking step S3093 of importing the key semantic segment into the candidate operation selected by the user through the instruction argument and evoking the candidate operation selected by the user by using the evoking instruction.

Preferably, as shown in FIG. 12 (FIG. 12 shows a flowchart of an operation instruction generating processing in the information processing method according to the present invention), the operation instruction generating step S3091 further comprises S30911 of generating an instruction for evoking a candidate operation, S30912 of generating an instruction for calling an interface function of the candidate operation, and S30913 of passing the key semantic segment in the structured semantics to the interface function in the form of candidate operation interface argument.

As shown in FIG. 10A, when a specific touch controlled operation to the display information of "Please contact Mr. Wang of Tricorn (Beijing) Technology Co., Ltd., the telephone number is 18512345678" by the user is detected in step S101, the process proceeds to steps S102 to S102 of the information processing method of the second embodiment, each of semantic segments of the text-of-interest as shown in FIG. 10B is obtained, and after the user intent obtaining step S205, the user intents of "search address book" and "search call record" are obtained. In the candidate operation determining step S206, it is determined that the system built-in application programs of "address book" and "call record" are called, and in the displaying step S207, the text-of-interest of "Please contact Mr. Wang of Tricorn (Beijing) Technology Co., Ltd., the telephone number is 18512345678" with the types (see the icons of the place, the character and the phone in FIG. 10B) of the semantic segments marked is displayed on the display of the information processing apparatus together with the determined candidate operations of iii "address book" and "call record", as shown in FIG. 10B. Then, in step S308, if it is detected that the user selects the "address book", the process proceeds to step S309, the key semantic segments of "Mr. Wang", "Tricorn (Beijing) Technology Co., Ltd." and "18512345678" are imported into the application program of "address book" and the application program of "address book" is evoked, as shown in FIG. 10C.

As another example, for example, the display information is "I'm going to Shanghai tomorrow" and the text-of-interest of "I'm going to Shanghai tomorrow" is obtained. After semantic analysis, the following structural semantics are obtained: "Destination: Shanghai, Date.Relative: +1 (representing the current date plus one day), Departure: _current_city (representing that the current city is automatically acquired according to the system GPS positioning), and the corresponding intent is Ticket, and the list of the application programs which are candidate operations may be Ctrip, calendar, WeChat, etc. When the user selects "Ctrip", it is directly entered the Ticket page, and the information of departure, destination and date, etc. are automatically filled in.

According to the information processing method of the third embodiment, by detecting the selection to the displayed candidate operations by the user, and importing the key semantic segment which is associated with the user intent matching the respective selected candidate operation into the candidate operation selected by the user and evoking it, the following technical effects are achieved: the operation evoking step enables the application selected by the user to automatically perform the desired operation on the key semantic segment in the text, which improves the friendliness of the interface and the convenience of the user's operation.

[Software Structure of Information Processing Apparatus According to Third Embodiment]

Figure 13:
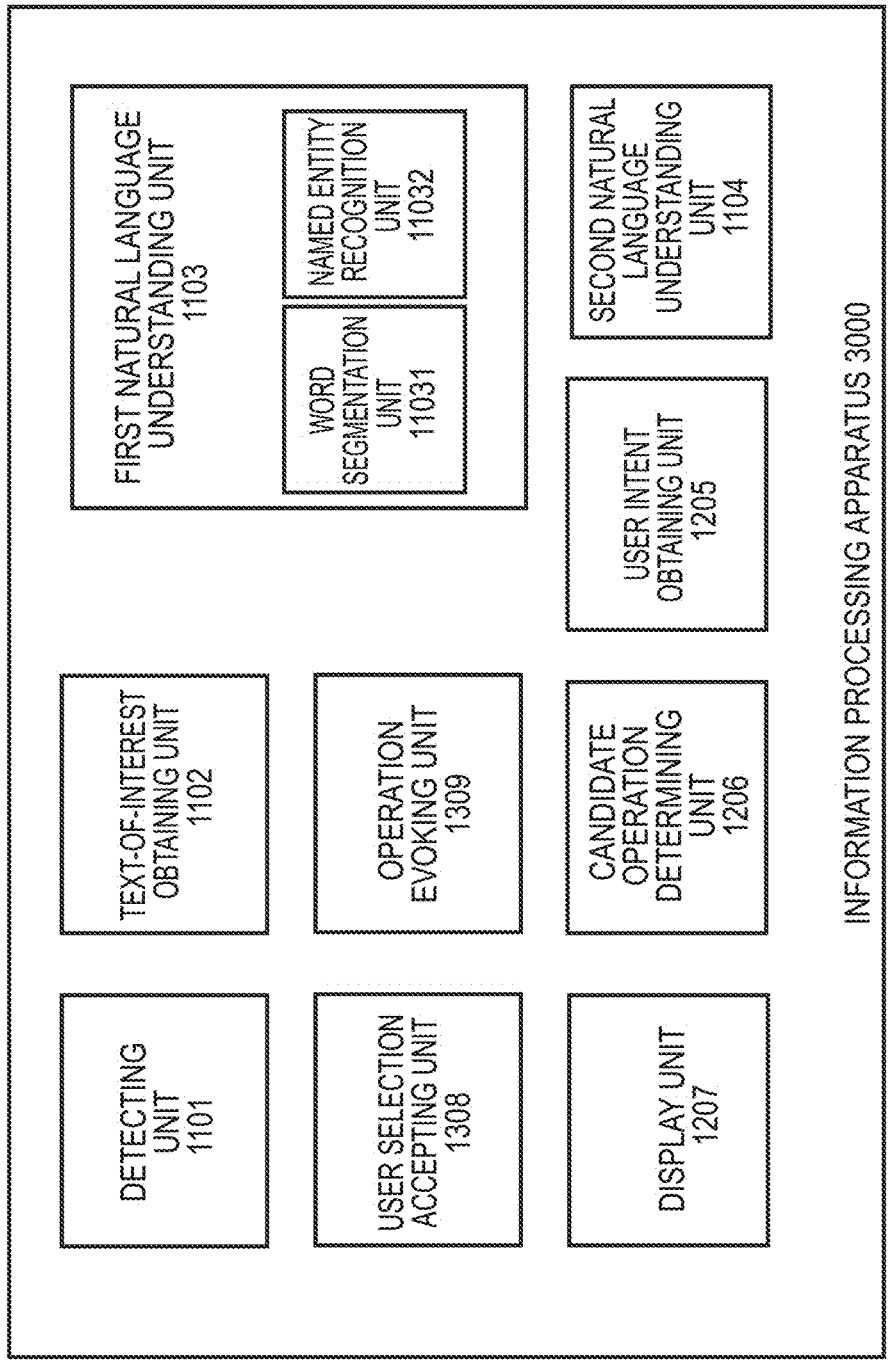
FIG. 13 is a block diagram illustrating a software configuration of the information processing apparatus according to the third embodiment.

FIG. 13 is a block diagram illustrating a software configuration of the information processing apparatus according to the third embodiment. As shown in FIG. 13, the information processing apparatus 3000 according to the third embodiment is different from the information processing apparatus 2000 according to the second embodiment in that a user selection accepting unit 1308 and an operation evoking unit 1309 are added.

Specifically, the user selection accepting unit 1308 detects the selection to the displayed candidate operations by the user, and the operation evoking unit 1309 evokes the candidate operation selected by the user by using the key semantic segment which is associated with the user intent matching the respective selected candidate operation as a semantic segment for importing into the operation to be evoked.

Fourth Embodiment

[Information Processing Method According to Fourth Embodiment]

Figure 14:
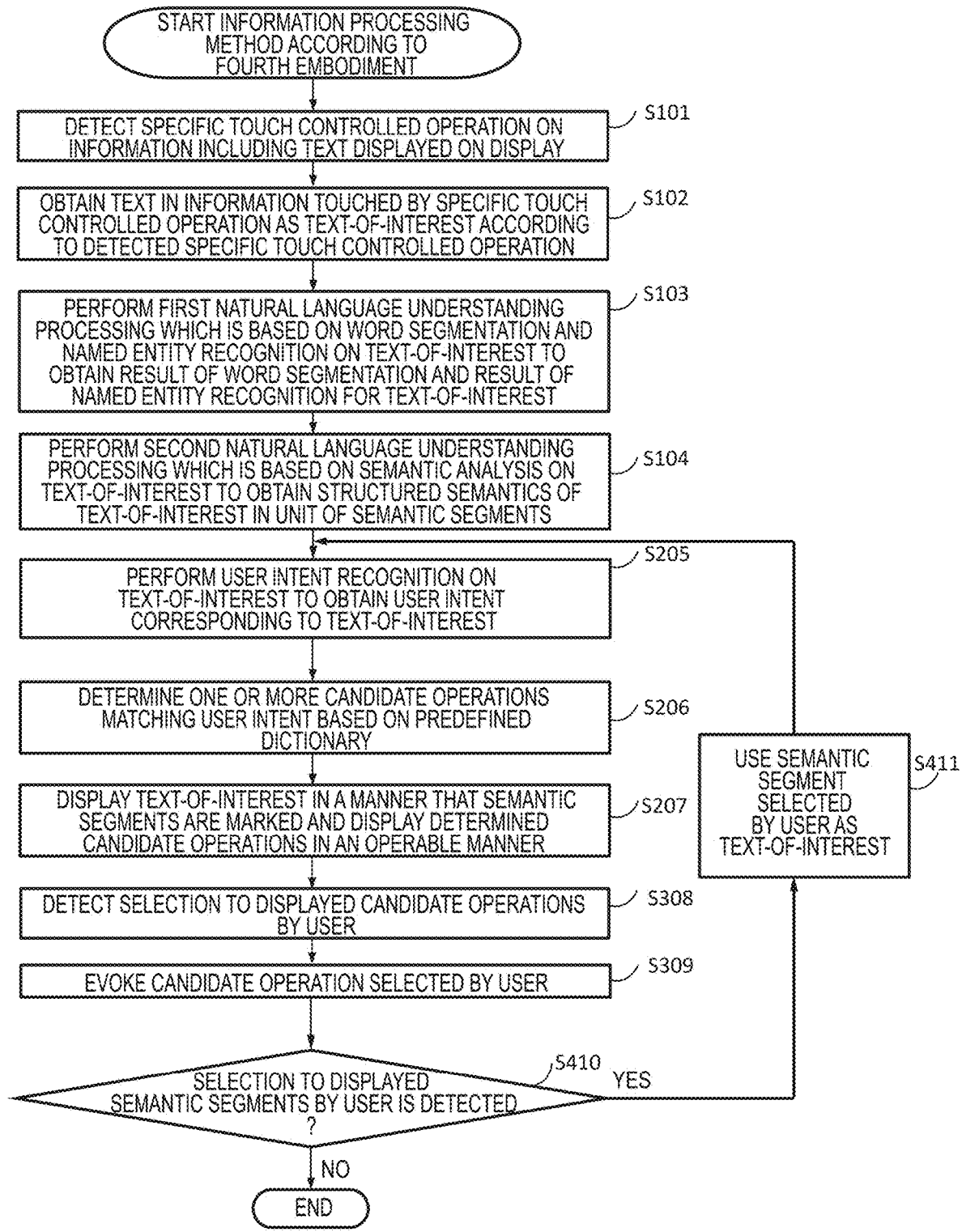
FIG. 14 is a flowchart illustrating an information processing method according to a fourth embodiment of the present invention.

An information processing method according to a fourth embodiment of the present invention will be described below in conjunction with FIG. 14 and FIGS. 15A to 15E, in which, FIG. 14 is a flowchart illustrating an information processing method according to the fourth embodiment of the present invention, and FIGS. 15A to 15E are exemplary display screens schematically illustrating the operation procedures of the information processing method according to the fourth embodiment of the present invention.

As shown in FIG. 14, the information processing method according to the fourth embodiment is different from the information processing method according to the third embodiment in that a semantic segment selection judging step S410 and a text-of-interest resetting step S411 are added.

Specifically, in the semantic segment selection judging step S410, it is judged whether the selection to the displayed semantic segments by the user is detected; if it is detected that the semantic segment is selected by the user, the process proceeds to the text-of-interest resetting step S411 in which the semantic segment selected by the user is used as the text-of-interest, then the process returns to step S205 and the second natural language understanding processing is applied to the semantic segment selected by the user. That is, steps S205 to S309 are repeated. If it is judged in step S410 that the selection to the displayed semantic segment by the user is not detected, the process ends.

Figure 15A:
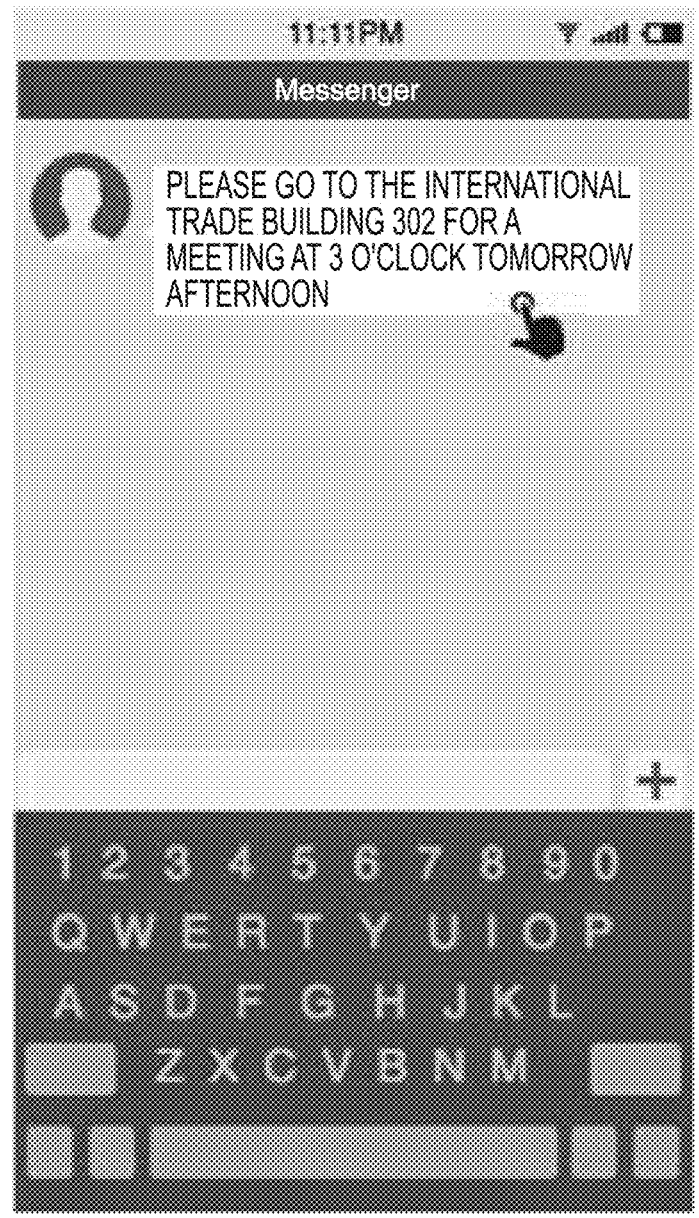
FIGS. 15A to 15E are exemplary display screens schematically illustrating the operation procedures of the information processing method according to the fourth embodiment of the present invention.
Figure 15B:
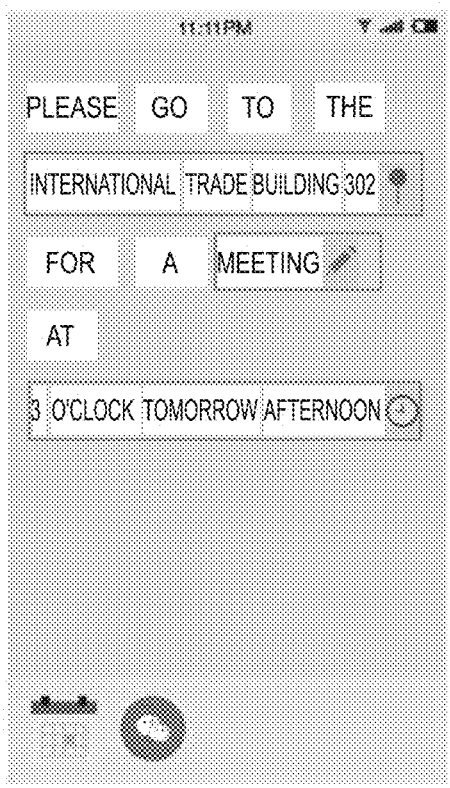
Figure 15C:
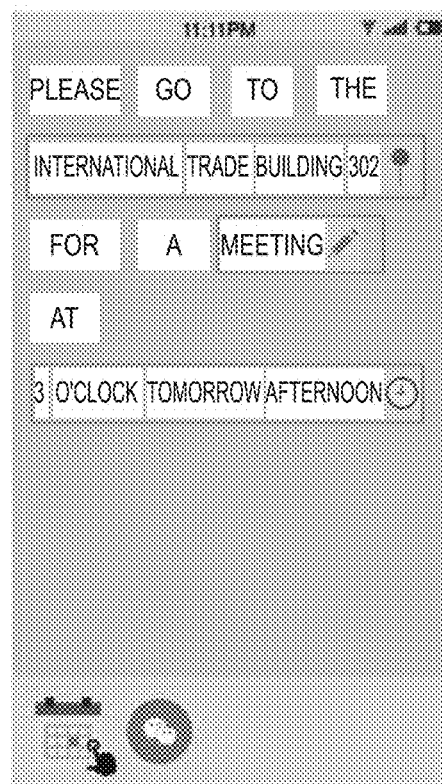
Figure 15D:
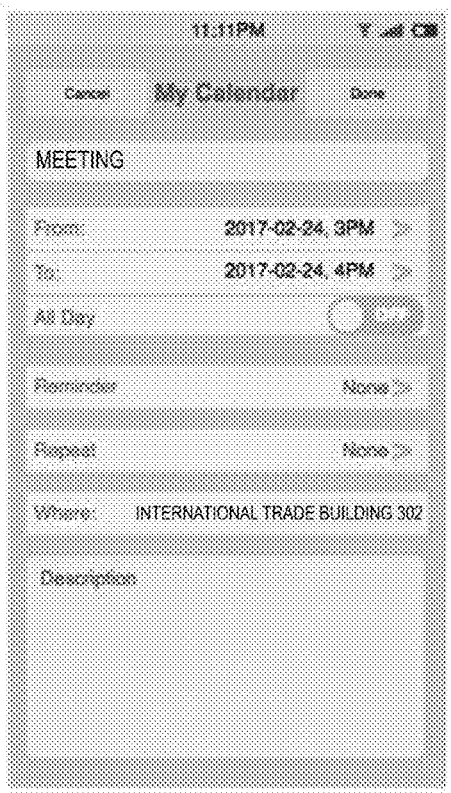

For example, as shown in FIG. 15C, when it is detected in step S308 that the user selects the software of "calendar", the process proceeds to step S309, and as shown in FIG. 15D, the key semantic segments of "3 o'clock tomorrow afternoon", "International Trade Building 302" and "meeting", which are associated with the user intent of "Reminder" matching the respective selected candidate operation of "Calendar" are imported into the application program of "Calendar", and the application program of "Calendar" is evoked. For ease of understanding, the candidate operations of "Calendar" and "WeChat" are shown schematically below in the JSON structure:

```
[
    {
        "app_name" : "Calendar",
        "app_type": "system",
        "command" : "create_calendar_event",
        "arguments":            "{\"time\":\"2017-02-24
15:00:00\",\"location\":\"International     Trade     Building
302\",\"title\":\"meeting\"}"
    },
    {
        "app_name" : "WeChat",
        "app_type": "third_party",
        "command" : "share_to_wechat",
        "arguments": "{\"text\":\"Please go to the International Trade
Building 302 for a meeting at 3 o'clock tomorrow afternoon\"}"
    }
]
```

Where, app_name represents the unique identification ID of the candidate operation, app_type represents the type of the candidate operation, command is a predefined command name for calling candidate operation and arguments is an argument passed to the calling command.

Figure 15E:
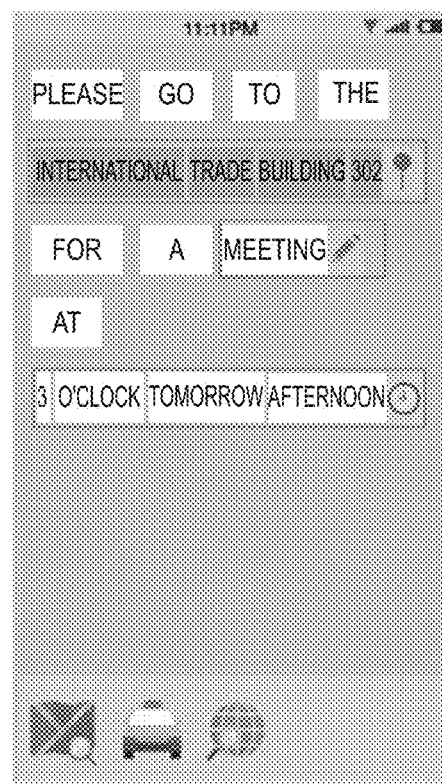

After the import is completed, as shown in FIG. 15E, if it is judged in step S410 that it is detected that the address semantic segment of "International Trade Building 302" is selected by the user, the process proceeds to step S411 and the semantic segment of "International Trade Building 302" selected by the user is used as the text-of-interest, then the process returns to step S205 and the intent of "Address" is recognized. A plurality of candidate operations matching the intent of "Address", namely, the application program of "electronic map", the application program of "network car", and website link of "search engine", are determined in step S206 and then are displayed in step S207.

According to the information processing method of the fourth embodiment, by judging whether the selection to the displayed semantic segment by the user is detected and using the semantic segment selected by the user as the text-of-interest so as to apply the second natural language understanding processing to the semantic segment selected by the user in the case where it is judged that it is detected that the semantic segment is selected by the user, the following technical effects are achieved: the semantic segment selected by the user may be merged together to re-execute the procedure of the first embodiment, and the results of the first embodiment may also be used in part or in whole to continue the subsequent operations, thereby improving the friendliness of the interface and the convenience of the user's operation.

[Software Structure of Information Processing Apparatus According to Fourth Embodiment]

Figure 16:
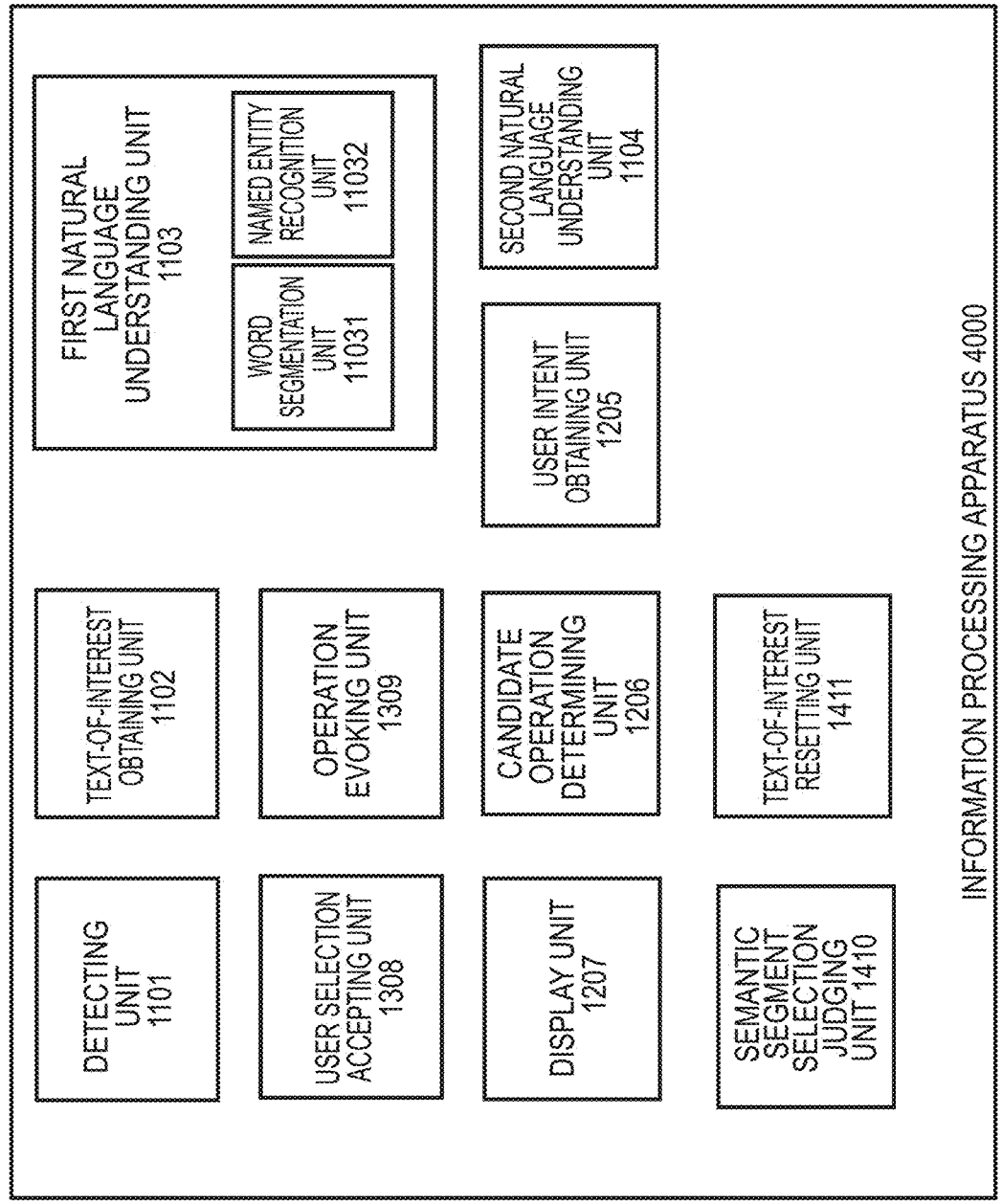
FIG. 16 is a block diagram illustrating a software configuration of the information processing apparatus according to the fourth embodiment.

FIG. 16 is a block diagram illustrating a software configuration of the information processing apparatus according to the fourth embodiment. As shown in FIG. 16, the information processing apparatus 4000 according to the fourth embodiment is different from the information processing apparatus 3000 according to the third embodiment in that a semantic segment selection judging unit 1410 and a text-of-interest resetting unit 1411 are added.

Specifically, the semantic segment selection judging unit 1410 judges whether the selection to the displayed semantic segment by the user is detected; the text-of-interest resetting unit 1411 uses the semantic segment selected by the user as the text-of-interest so as to apply the second natural language understanding processing to the semantic segment selected by the user in the case where it is judged that it is detected that the semantic segment is selected by the user.

Fifth Embodiment

[Information Processing Method According to Fifth Embodiment]

Figure 17:
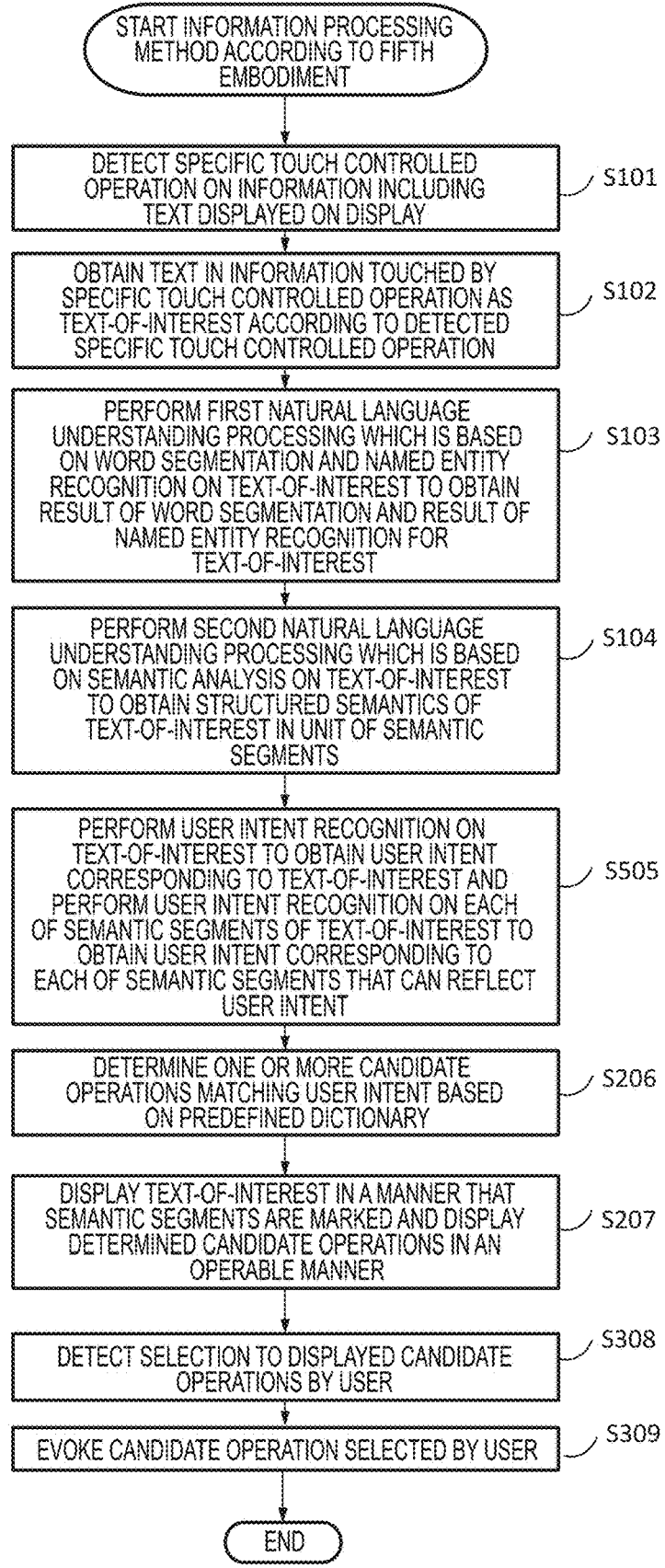
FIG. 17 is a flowchart illustrating an information processing method according to a fifth embodiment of the present invention.
Figure 18A:
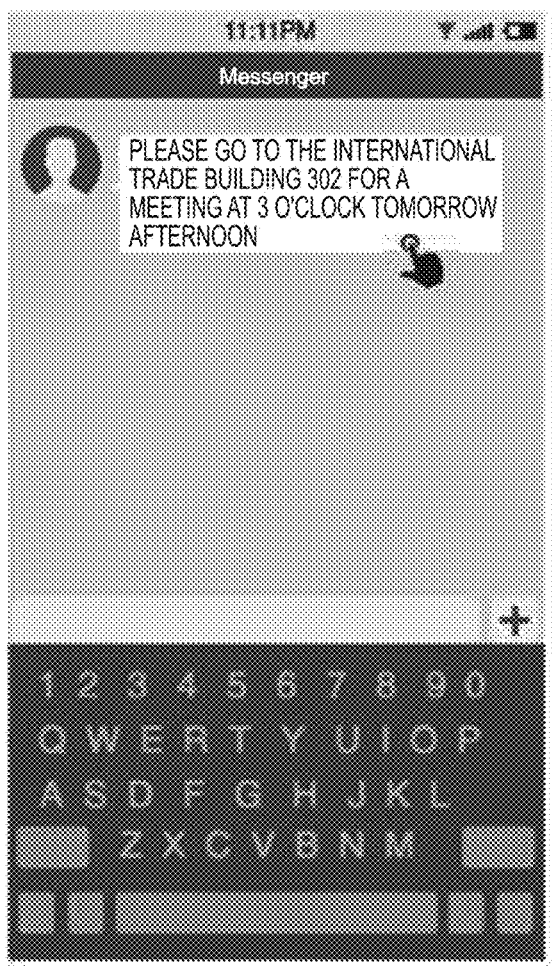
FIGS. 18A and 18B are exemplary display screens schematically illustrating the operation procedures of the information processing method according to the fifth embodiment of the present invention.
Figure 18B:
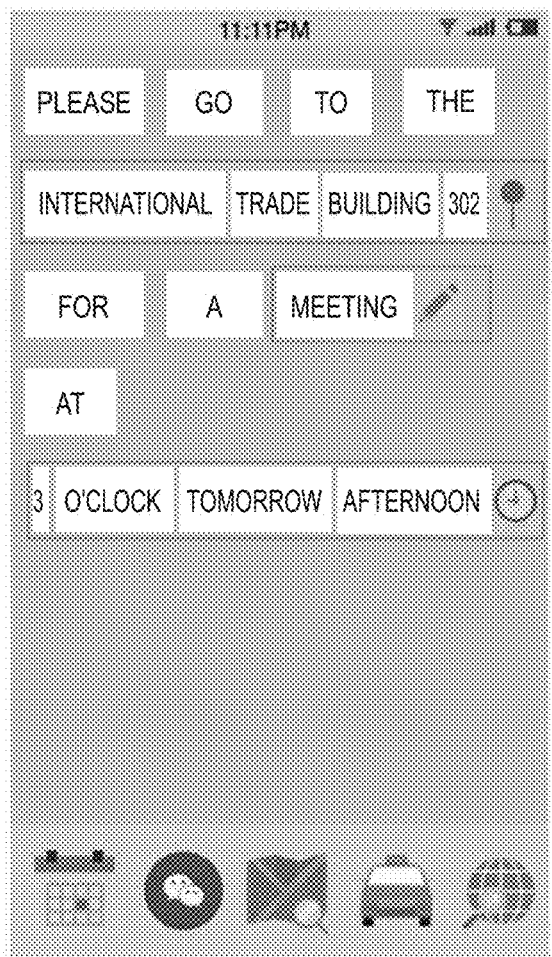

An information processing method according to a fifth embodiment of the present invention will be described below in conjunction with FIG. 17 and FIGS. 18A and 18B, in which, FIG. 17 is a flowchart illustrating an information processing method according to the fifth embodiment of the present invention, and FIGS. 18A and 18B are exemplary display screens schematically illustrating the operation procedures of the information processing method according to the fifth embodiment of the present invention.

As shown in FIG. 17, the information processing method according to the fifth embodiment is different from the information processing method according to the third embodiment in that, in the user intent obtaining step S505, the user intent recognition is performed on the text-of-interest to obtain the user intent corresponding to the textof-interest, and the user intent recognition is performed on each of semantic segments of the text-of-interest to obtain the user intent corresponding to each of semantic segments that can reflect the user intent.

For example, as shown in FIG. 18 B, the candidate operations of "calendar" and "WeChat" associated with the text-of-interest of "Please go to the International Trade Building 302 for a meeting at 3 o'clock tomorrow afternoon" and the candidate operations associated with the address semantic segment of "International Trade Building 302", namely, the application program of "electronic map", the application program of "network car", and website link of "search engine", are displayed together for selection by the user (in view of the limited number of candidate operations that can be displayed at the same time, the candidate operations associated with the time semantic segment of "3 o'clock tomorrow afternoon" are hidden from view and may be displayed by sliding the list of the candidate operations for example). Thereafter, as described in the third embodiment, the selection to the displayed candidate operations by the user may be detected and the candidate operation selected by the user may be evoked. For example, when the selection to the "calendar" or "WeChat" by the user is detected, the selected candidate operation is evoked with respect to the text-of-interest of "Please go to the International Trade Building 302 for a meeting at 3 o'clock tomorrow afternoon"; and when the selection to "electronic map", "network car", or "search engine" by the user is detected, the selected candidate operation is evoked with respect to the address semantic segment of "International Trade Building 302".

Ticket may be as another example, for example, the text-of-interest is "I'm going to Shanghai tomorrow" and the semantic analysis thereof is "Destination: Shanghai, Date.Relative: +1 (representing the current date plus one day), Departure: _current_city (representing that the current city is automatically acquired according to the system GPS positioning). The corresponding intent is Ticket, and the list of the application programs may be Ctrip, calendar, WeChat, etc. When the user clicks on "Ctrip", it is directly entered the Ticket page, and the information of departure, destination and date, etc. are automatically filled in.

According to the information processing method of the fifth embodiment, by performing the user intent recognition on each of semantic segments of the text-of-interest and obtaining the candidate operations corresponding to the user intent, the following technical effects are achieved: the candidate operations corresponding to the text-of-interest and the candidate operations corresponding to each of semantic segments that may reflect the user intent are displayed to the user together, such that it is more convenient for the user to achieve performing desired operation on the text-of-interest or the semantic segments in the text-of-interest, thereby improving the friendliness of the interface and the convenience of the user's operation.

[Software Structure of Information Processing Apparatus According to Fifth Embodiment]

FIG. 19 is a block diagram illustrating a software configuration of the information processing apparatus according to the fifth embodiment. As shown in FIG. 19, the information processing apparatus 5000 according to the fifth embodiment is different from the information processing apparatus 3000 according to the third embodiment in that the user intent obtaining unit 1205 is replaced with a user intent obtaining unit 1505, in which the user intent obtaining unit 1505 further performs the user intent recognition on each of semantic segments of the text-of-interest so as to obtain the user intent corresponding to each of semantic segments that can reflect the user intent in addition to performing the user intent recognition on the text-of-interest to obtain the user intent corresponding to the text-of-interest.

Although the present invention has been described above with reference to the exemplary embodiments, the foregoing embodiments are merely intended to illustrate the technical concepts and features of the present invention and do not limit the protection scope of the present invention. Any equivalent variations or modifications made according to the spirit of the present invention should be encompassed within the protection scope of the present invention.

What is claimed is:

1. An information processing method for an information processing apparatus having a touch screen for displaying information, the information processing method comprising:
   detecting a specific touch operation on information including a text displayed on the touch screen;
   obtaining the text in the information as a text-of-interest according to the detected specific touch operation;
   performing a first natural language understanding processing based on word segmentation and named entity recognition on the text-of-interest to obtain a result of the word segmentation and a result of the named entity recognition for the text-of-interest;
   performing a second natural language understanding processing based on semantic analysis on the text-of-interest to obtain structured semantics of the text-of-interest in unit of semantic segment, wherein the structured semantics includes semantic segments and a class of each of the semantic segments;
   generating a display interface and assigning one view control to each of the semantic segments; and
   displaying the semantic segments in a separated manner, wherein the semantic segments are arranged in separately-displayed view controls on the display interface.

2. The information processing method according to claim 1, further comprising:
   performing user intent recognition on the text-of-interest to obtain a user intent corresponding to the text-of-interest;
   determining one or more candidate operations matching the user intent based on a predefined dictionary, and
   displaying the determined candidate operations in an operable manner on the same display interface that presents the semantic segments in the separately-displayed view controls.

3. The information processing method according to claim 2, wherein a semantic segment related to the obtained respective user intent among the semantic segments of the text-of-interest is further stored as a key semantic segment in association with the user intent, and the information processing method further comprising:
   detecting a selection to the displayed candidate operations by the user; and
   evoking the candidate operation selected by the user by using a key semantic segment which is associated with the user intent matching the respective selected candidate operation as a semantic segment for importing into the candidate operation to be evoked.

4. The information processing method according to claim 3, further comprising:
   determining whether a selection to the displayed semantic segments by the user is detected; and
   using the semantic segment selected by the user as the text-of-interest so as to apply the second natural language understanding processing to the semantic segment selected by the user upon determining that the selection to the displayed semantic segments by the user is detected.

5. The information processing method according to claim 3, wherein evoking the candidate operation further comprises:
generating a calling instruction for calling the candidate operation based on the structured semantics and the user intent, the calling instruction including evoking instruction and instruction argument;
extracting the key semantic segment as instruction argument according to the calling instruction triggered by the detected selection by the user; and
importing the key semantic segment into the candidate operation selected by the user through the instruction argument and evoking the candidate operation selected by the user by using the evoking instruction.

6. The information processing method according to claim 2, wherein
the user intent recognition is further performed on each of the semantic segments of the text-of-interest to obtain the user intent corresponding to each of the semantic segments that can reflect the user intent.

7. The information processing method according to claim 2, further comprising:
displaying the text-of-interest in a manner that a key semantic segment related to the user intent among the semantic segments of the text-of-interest is marked on type basis, wherein different types of key semantic segments is marked differently; and
wherein the candidate operation is a candidate application program or a candidate website link that is capable of matching the user intent.

8. The information processing method according to claim 2, further comprising:
sorting the determined candidate operations to obtain a ranking of the determined candidate operations, and
displaying the selected candidate operations in accordance with the ranking.

9. The information processing method according to claim 1, wherein the text-of-interest is displayed in a manner of word segmentation with a semantic segment mark.

10. An information processing apparatus having a touch screen for displaying information, the information processing apparatus comprising:
a detecting unit for detecting a specific touch operation on information including a text displayed on the touch screen;
a text-of-interest obtaining unit for obtaining the text in the information as a text-of-interest according to the detected specific touch operation;
a first natural language understanding unit for performing a first natural language understanding processing based on word segmentation and named entity recognition on the text-of-interest to obtain a result of the word segmentation and a result of the named entity recognition for the text-of-interest;
a second natural language understanding unit for performing a second natural language understanding processing which is based on semantic analysis on the text-of-interest to obtain structured semantics of the text-of-interest in unit of semantic segment, wherein the structured semantics includes semantic segments and a class of each of the semantic segments; and
a display unit for generating a display interface and assigning one view control to each of the semantic segments, and displaying the semantic segments in a separated manner, wherein the semantic segments are arranged in separately-displayed view controls on the display interface,
wherein the detecting unit, the text-of-interest obtaining unit, the first natural language understanding unit, the second natural language understanding unit, and the display unit are implemented via a processor.

11. The information processing apparatus according to claim 10, further comprising:
a user intent obtaining unit for performing user intent recognition on the text-of-interest to obtain a user intent corresponding to the text-of-interest; and
a candidate operation determining unit for determining one or more candidate operations matching the user intent based on a predefined dictionary,
wherein the display unit further displays the determined candidate operations in an operable manner on the same display interface that presents the semantic segments in the separately-displayed view controls, and
wherein the user intent obtaining unit and the candidate operation determining unit are implemented via the processor.

12. The information processing apparatus according to claim 11, wherein
the user intent obtaining unit further stores a semantic segment related to the obtained respective user intent among the semantic segments of the text-of-interest as a key semantic segment in association with the user intent, and the information processing apparatus further comprising:
a user selection accepting unit for detecting a selection to the displayed candidate operations by the user; and
an operation evoking unit for evoking the candidate operation selected by the user by using a key semantic segment which is associated with the user intent matching the respective selected candidate operation as a semantic segment for importing into the candidate operation to be evoked,
wherein the user selection accepting unit and the operation evoking unit are implemented via the processor.

13. The information processing apparatus according to claim 12, further comprising:
a semantic segment selection judging unit for judging whether a selection to the displayed semantic segments by the user is detected; and
a text-of-interest resetting unit for using the semantic segment selected by the user as the text-of-interest so as to apply the second natural language understanding processing to the semantic segment selected by the user in a case where it is judged by the semantic segment selection judging unit that the selection to the displayed semantic segments by the user is detected,
wherein the semantic segment selection judging unit and the text-of-interest resetting unit are implemented via the processor.

14. The information processing apparatus according to claim 12, wherein the operation evoking unit further comprises:
an operation instruction generating unit for generating a calling instruction for calling the candidate operation based on the structured semantics and the user intent, the calling instruction including evoking instruction and instruction argument;
a key semantic segment extracting unit for extracting the key semantic segment as instruction argument according to the calling instruction triggered by the detected selection by the user; and an importing and evoking unit for importing the key semantic segment into the candidate operation selected by the user through the instruction argument and evoking the candidate operation selected by the user by using the evoking instruction, wherein the operation instruction generating unit, the key semantic segment extracting unit, and the importing and evoking unit are implemented via the processor.

15. The information processing apparatus according to claim 11, wherein the user intent obtaining unit further performs the user intent recognition on each of the semantic segments of the text-of-interest to obtain the user intent corresponding to each of the semantic segments that can reflect the user intent.

16. The information processing apparatus according to claim 11, wherein
the display unit displays the text-of-interest in a manner that a key semantic segment related to the user intent among the semantic segments of the text-of-interest are mark on type basis, and
wherein the candidate operation is a candidate application program or a candidate website link that is capable of matching the user intent.

17. The information processing apparatus according to claim 11, wherein
the candidate operation determination unit includes a candidate operation sorting unit for sorting the determined candidate operations, and
the display unit displays the selected candidate operations in accordance with a ranking by the candidate operation sorting unit,
wherein the candidate operation sorting unit is implemented via the processor.

18. The information processing apparatus according to claim 10, wherein the display unit displays the text-of-interest in a manner of word segmentation with a semantic segment mark.

19. A computer-readable non-transitory storage medium storing a computer program, which when executed by a processor, implements an information processing method for an information processing apparatus having a touch screen for displaying information, the information processing method comprising:
detecting a specific touch operation on information including a text displayed on the touch screen;
obtaining the text in the information as a text-of-interest according to the detected specific touch operation;
performing a first natural language understanding processing based on word segmentation and named entity recognition on the text-of-interest to obtain a result of the word segmentation and a result of the named entity recognition for the text-of-interest;
performing a second natural language understanding processing based on semantic analysis on the text-of-interest to obtain structured semantics of the text-of-interest in unit of semantic segment, wherein the structured semantics includes semantic segments and a class of each of the semantic segments;
generating a display interface and assigning one view control to each of the semantic segments; and
displaying the semantic segments in a separated manner, wherein the semantic segments are arranged in separately-displayed view controls on the display interface.

20. An information processing apparatus having a touch controllable display for displaying information, the information processing apparatus comprising:

a detecting unit for detecting a specific touch operation on information including a text displayed on the touch screen;
a text-of-interest obtaining unit for obtaining the text in the information as a text-of-interest according to the detected specific touch operation;
a user intent obtaining unit for performing user intent recognition on the text-of-interest to obtain a user intent corresponding to the text-of-interest;
a candidate operation determining unit for determining candidate operations matching the user intent based on a predefined dictionary;
a first natural language understanding unit for performing a first natural language understanding processing which is based on word segmentation and named entity recognition on the text-of-interest to obtain a result of the word segmentation and a result of the named entity recognition for the text-of-interest;
a second natural language understanding unit for performing a second natural language understanding processing which is based on semantic analysis on the text-of-interest to obtain structured semantics of the text-of-interest in unit of semantic segment, wherein the structured semantics includes semantic segments and a class of each of the semantic segments; and
a display unit for generating a display interface and assigning one view control to each of the semantic segments, and displaying the semantic segments in a separated manner and the determined candidate operations in an operable manner on the display interface, wherein the semantic segments are arranged in separately-displayed view controls, and the user intent obtaining unit stores a semantic segment related to the obtained respective user intent among the semantic segments of the text-of-interest as a key semantic segment in association with the user intent,
wherein the detecting unit, the text-of-interest obtaining unit, the user intent obtaining unit, the candidate operation determining unit, the first natural language understanding unit, the second natural language understanding unit, and the display unit are implemented via a processor.

21. The information processing apparatus according to claim 20, further comprising:
a user selection accepting unit for detecting a selection to the displayed candidate operations by the user; and
an operation evoking unit for evoking the candidate operation selected by the user by using a key semantic segment which is associated with the user intent matching the respective selected candidate operation as a semantic segment for importing into the candidate operation to be evoked,
wherein the user selection accepting unit and the operation evoking unit are implemented via the processor.

22. An information processing method for an information processing apparatus having a touch screen for displaying information, the information processing method comprising:
detecting a specific touch operation on information including a text displayed on the touch screen;
obtaining the text in the information as a text-of-interest according to the detected specific touch controlled operation;
performing user intent recognition on the text-of-interest to obtain a user intent corresponding to the text-of-interest;
determining candidate operations matching the user intent based on a predefined dictionary;

performing a first natural language understanding processing which is based on word segmentation and named entity recognition on the text-of-interest to obtain a result of the word segmentation and a result of the named entity recognition for the text-of-interest;

performing a second natural language understanding processing which is based on semantic analysis on the text-of-interest to obtain structured semantics of the text-of-interest in unit of semantic segment, wherein the structured semantics includes semantic segments and a class of each of the semantic segments;

generating a display interface and assigning one view control to each of the semantic segments; and displaying the semantic segments in a separated manner and the determined candidate operations in an operable manner on the display interface, wherein the semantic segments are arranged in separately-displayed view controls on the same display interface that presents the determined candidate operations, wherein a semantic segment related to the obtained respective user intent among the semantic segments of the text-of-interest is further stored as a key semantic segment in association with the user intent.

23. A computer-readable non-transitory storage medium storing a computer program, which when executed by a processor, implements an information processing method for an information processing apparatus having a touch screen for displaying information, the information processing method comprising:

detecting a specific touch operation on information including a text displayed on the touch screen;

obtaining the text in the information as a text-of-interest according to the detected specific touch controlled operation;

performing user intent recognition on the text-of-interest to obtain a user intent corresponding to the text-of-interest;

determining candidate operations matching the user intent based on a predefined dictionary;

performing a first natural language understanding processing which is based on word segmentation and named entity recognition on the text-of-interest to obtain a result of the word segmentation and a result of the named entity recognition for the text-of-interest;

performing a second natural language understanding processing which is based on semantic analysis on the text-of-interest to obtain structured semantics of the text-of-interest in unit of semantic segment, wherein the structured semantics includes semantic segments and a class of each of the semantic segments;

generating a display interface and assigning one view control to each of the semantic segments; and displaying the semantic segments in a separated manner and the determined candidate operations in an operable manner on the display interface, wherein the semantic segments are arranged in separately-displayed view controls on the same display interface that presents the determined candidate operations, wherein a semantic segment related to the obtained respective user intent among the semantic segments of the text-of-interest is further stored as a key semantic segment in association with the user intent.

* * * * *